(12) United States Patent
Reddy Arava et al.

(10) Patent No.: US 12,525,639 B2
(45) Date of Patent: Jan. 13, 2026

(54) STABILIZING GARNET-TYPE SOLID-STATE ELECTROLYTES THROUGH ATOMIC LAYER DEPOSITION OF ULTRA-THIN LAYERED MATERIALS AND METHODS OF MAKING SAME

(71) Applicants: Wayne State University, Detroit, MI (US); University of North Texas, Denton, TX (US)

(72) Inventors: Leela Mohana Reddy Arava, Troy, MI (US); Sathish Rajendran, Detroit, MI (US); Jeffry Kelber, Plano, TX (US); Aparna Pilli, Josephine, TX (US)

(73) Assignee: Wayne State University, Detroit, MI (US)

( * ) Notice: Subject to any disclaimer, the term of this patent is extended or adjusted under 35 U.S.C. 154(b) by 743 days.

(21) Appl. No.: 17/678,450

(22) Filed: Feb. 23, 2022

(65) Prior Publication Data

US 2022/0271334 A1    Aug. 25, 2022

Related U.S. Application Data

(60) Provisional application No. 63/152,945, filed on Feb. 24, 2021.

(51) Int. Cl.
*H01M 10/0562* (2010.01)
*C23C 16/455* (2006.01)
*H01M 10/052* (2010.01)

(52) U.S. Cl.
CPC .... *H01M 10/0562* (2013.01); *C23C 16/45555* (2013.01); *H01M 10/052* (2013.01); *H01M 2300/0071* (2013.01)

(58) Field of Classification Search
CPC ................................................ H01M 10/0562
See application file for complete search history.

(56) References Cited

U.S. PATENT DOCUMENTS

| | | | | |
|---|---|---|---|---|
| 2012/0045700 | A1* | 2/2012 | King | C23C 16/342 429/406 |
| 2012/0321791 | A1* | 12/2012 | Suzuki | C23C 16/45578 118/724 |
| 2017/0214054 | A1* | 7/2017 | Cui | H01M 50/46 |
| 2021/0280903 | A1* | 9/2021 | Yamamoto | H01M 10/0562 |

OTHER PUBLICATIONS

Han, Xiaogang, et al. "Negating interfacial impedance in garnet-based solid-state Li metal batteries." Nature materials 16.5 (2017): 572-579.21 (Year: 2017).*

Yan, Kai, et al. "Ultrathin two-dimensional atomic crystals as stable interfacial layer for improvement of lithium metal anode." Nano letters 14.10 (2014): 6016-6022. (Year: 2014).*

(Continued)

*Primary Examiner* — Allison Bourke
*Assistant Examiner* — Kayla Elaine Clary
(74) *Attorney, Agent, or Firm* — Fishman Stewart PLLC

(57) ABSTRACT

A method of stabilizing a garnet-type solid-state electrolyte (SSE) includes obtaining pellets of SSE, removing surface impurities of the SSE, and depositing a passivation layer onto the SSE after the surface impurities are removed, the passivation layer including two of boron, carbon, and nitrogen.

19 Claims, 13 Drawing Sheets

(56) References Cited

OTHER PUBLICATIONS

Jones, Jessica C., et al. "In situ x-ray photoelectron spectroscopy study of lithium carbonate removal from garnet-type solid-state electrolyte using ultra high vacuum techniques." Journal of Vacuum Science & Technology A 38.2 (2020). (Year: 2020).*

Cheng, Qian, et al. "Stabilizing solid electrolyte-anode interface in Li-metal batteries by boron nitride-based nanocomposite coating." Joule 3.6 (2019): 1510-1522. (Year: 2019).*

Park, Hamin, et al. "Large-scale synthesis of uniform hexagonal boron nitride films by plasma-enhanced atomic layer deposition." Scientific reports 7.1 (2017): 40091. (Year: 2017).*

Sugino et al. "Effect of oxygen plasma treatment on field emission characteristics of boron-nitride films." Applied physics letters 74.6 (1999): 889-891. (Year: 1999).*

Lorrette et al. "Deposition and characterization of hex-BN coating on carbon fibres using tris (dimethylamino) borane precursor." Journal of the European Ceramic Society 27.7 (2007): 2737-2743. (Year: 2007).*

C. Wang et al., "Conformal, Nanoscale ZnO Surface Modification of Garnet-Based Solid-State Electrolyte for Lithium Metal Anodes," Nano letters, 2017, vol. 17, No. 1, pp. 565-571.

Yutao Li et al., "Garnet Electrolyte with an Ultralow Interfacial Resistance for Li-Metal Batteries," J. Am. Chem. Soc., 2018, vol. 140, iss. 20, pp. 6448-6455.

Henghui Xu et al., "Li3N-Modified Garnet Electrolyte for All-Solid-State Lithium Metal Batteries Operated at 40° C.," Nano Letters, 2018, vol. 18, iss. 11, pp. 7414-7418.

Xiaogang Han et al., "Negating interfacial impedance in garnet-based solid-state Li metal batteries," Nature materials, May 2017, vol. 16, iss. 5; pp. 572-579.

Luo, Wei et al., "Transition from Superlithiophobicity to Superlithiophilicity of Garnet Solid-State Electrolyte," Journal of the American Chemical Society, 2016, vol. 138, iss. 37, pp. 12258-12262.

* cited by examiner

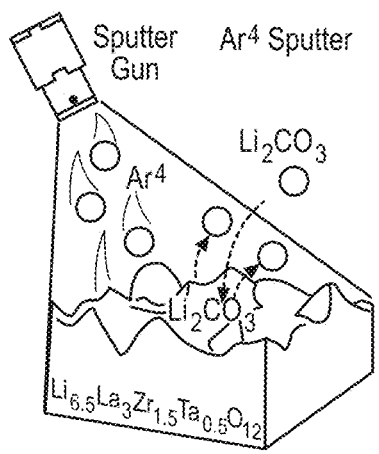 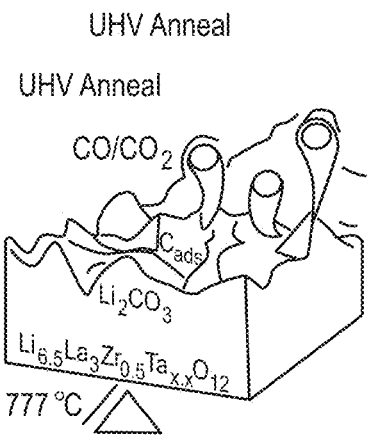
FIG. 1A    FIG. 1B
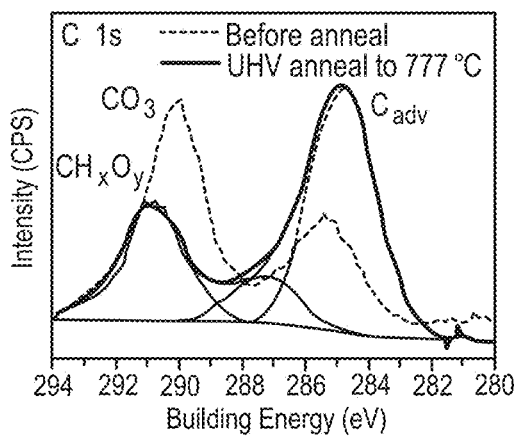 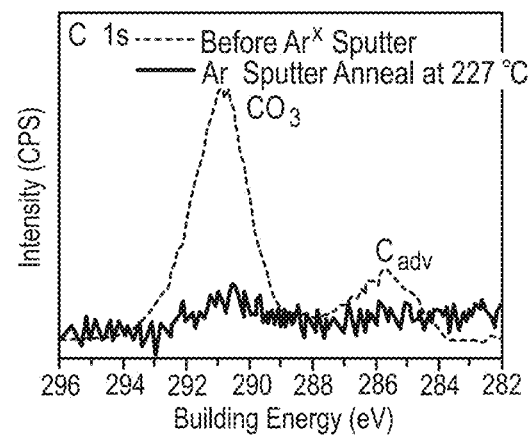
FIG. 1C    FIG. 1D
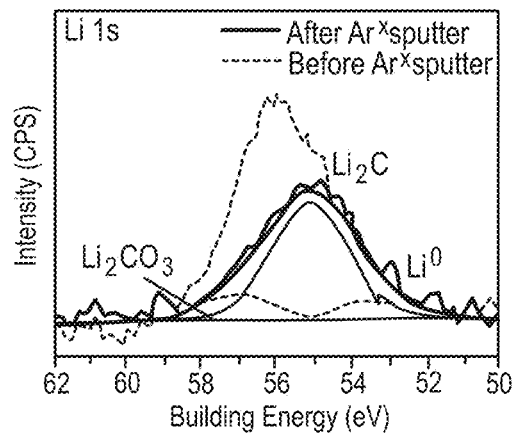 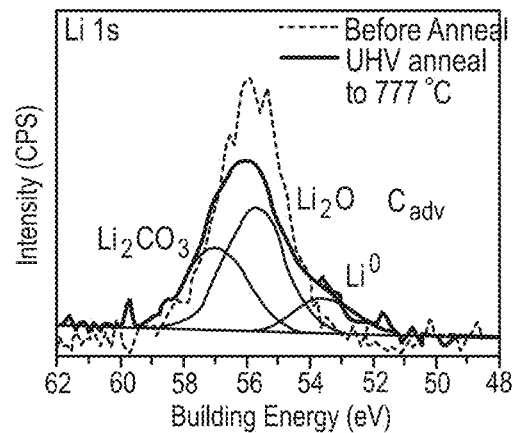
FIG. 1E    FIG. 1F

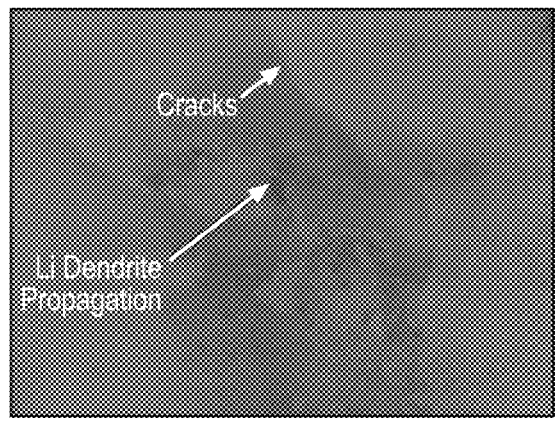
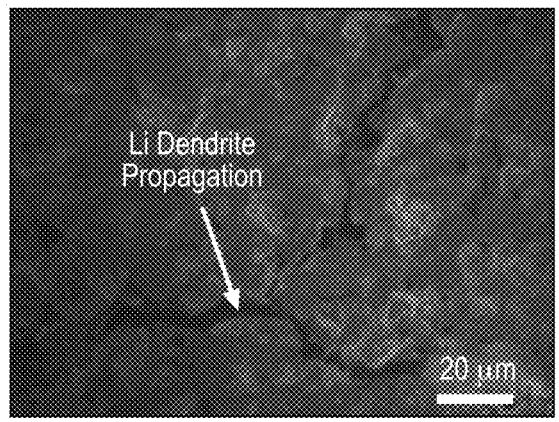
FIG. 5A                FIG. 5B
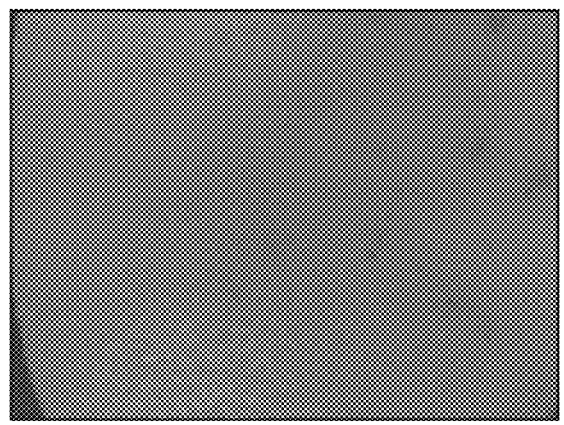
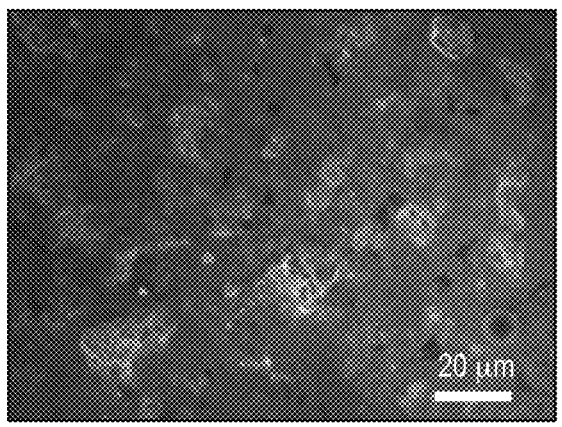
FIG. 5C                FIG. 5D

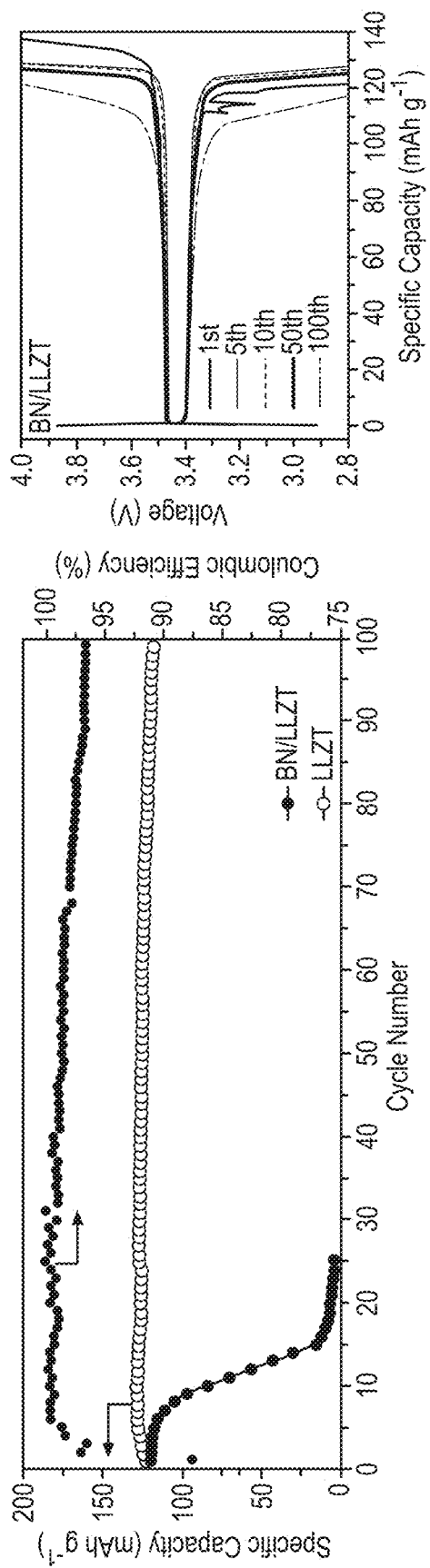
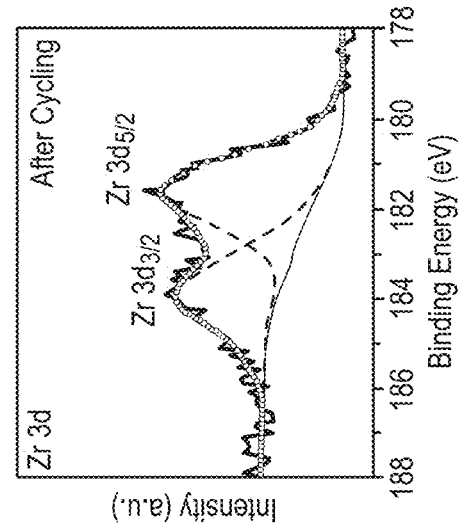
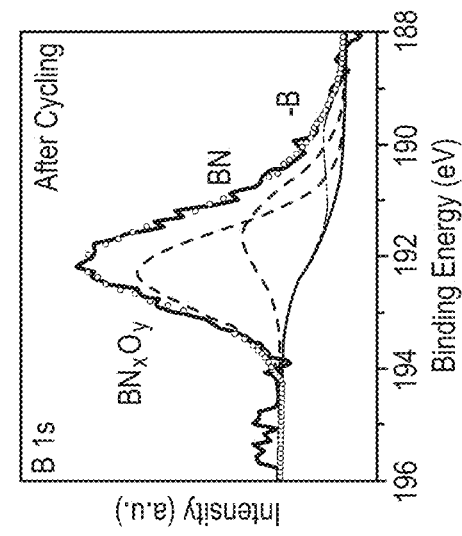
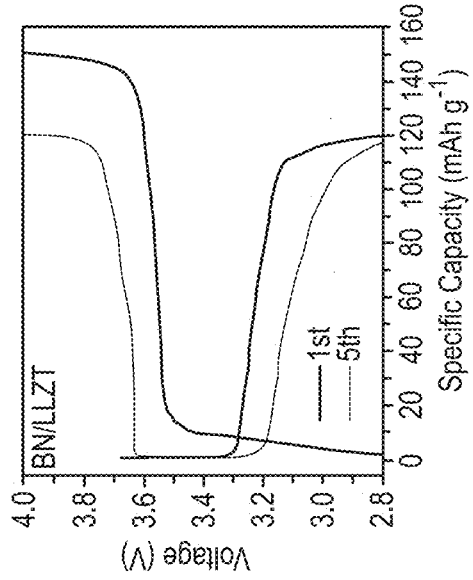
FIG. 6A
FIG. 6B
FIG. 6C
FIG. 6D
FIG. 6E

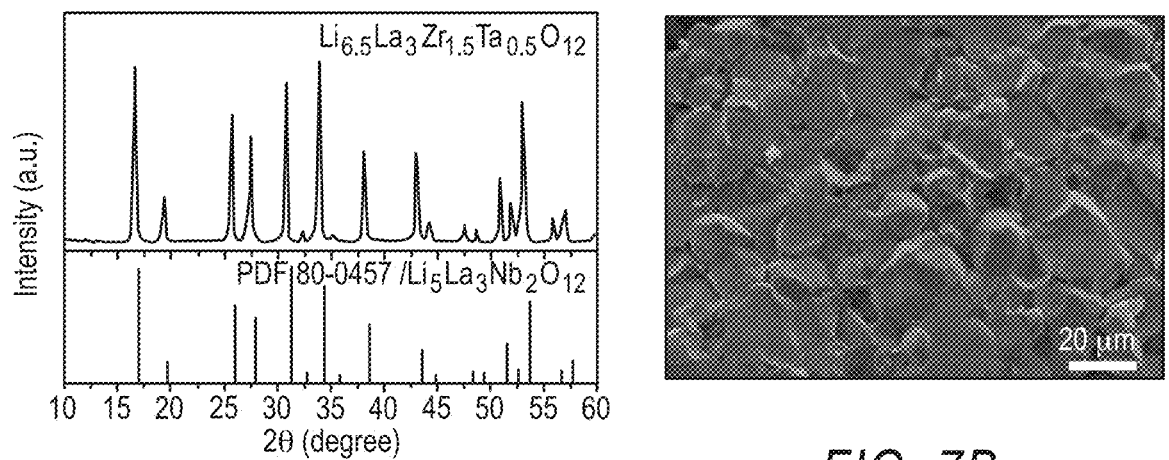
*FIG. 7A*
*FIG. 7B*
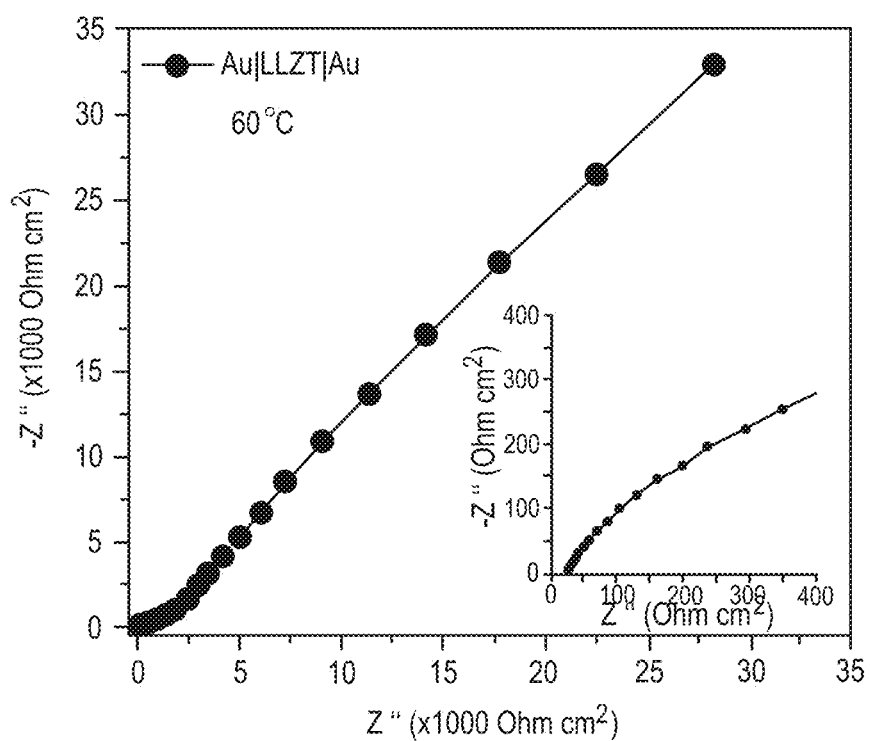
*FIG. 8*

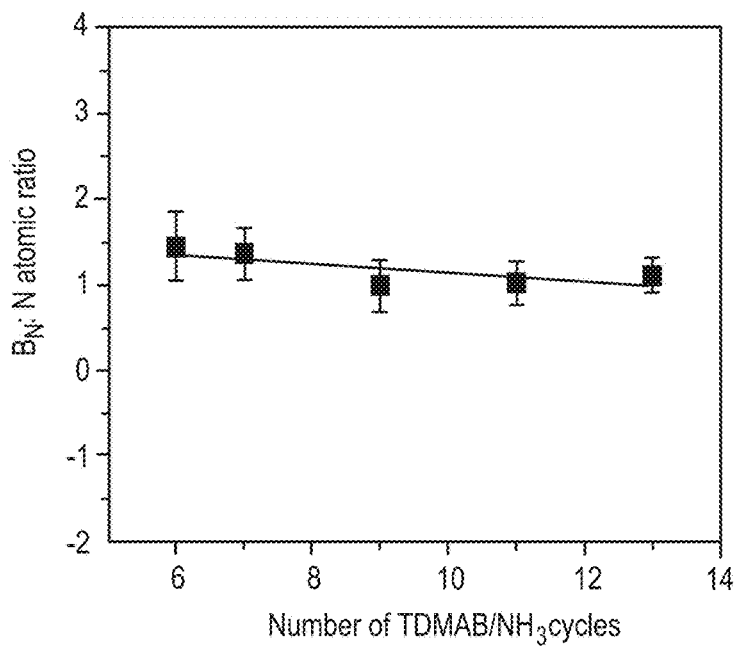
*FIG. 9*
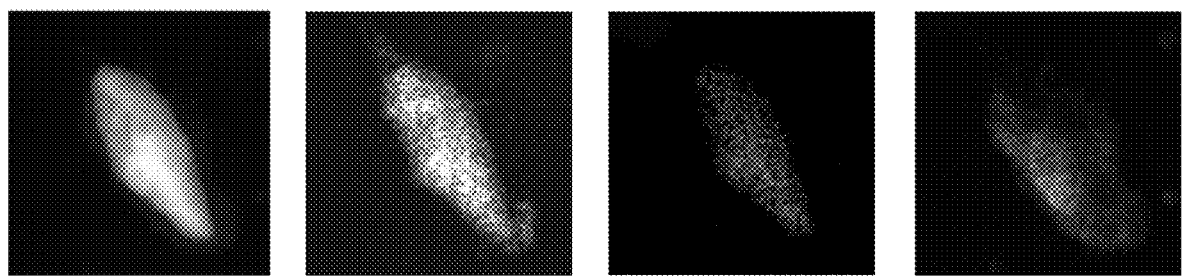
*FIG. 10A*    *FIG. 10B*    *FIG. 10C*    *FIG. 10D*
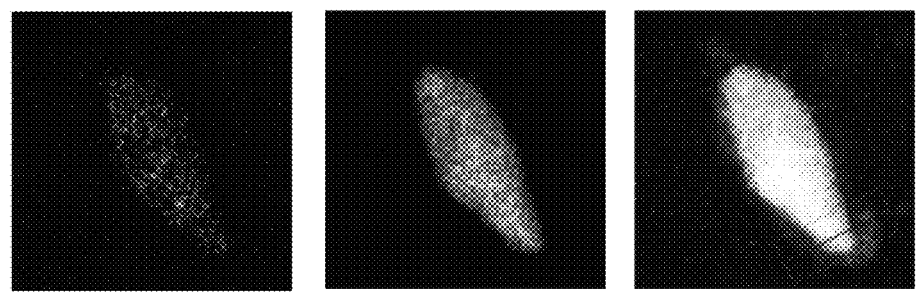
*FIG. 10E*    *FIG. 10F*    *FIG. 10G*

STABILIZING GARNET-TYPE SOLID-STATE ELECTROLYTES THROUGH ATOMIC LAYER DEPOSITION OF ULTRA-THIN LAYERED MATERIALS AND METHODS OF MAKING SAME

CROSS-REFERENCE TO RELATED APPLICATIONS

This application claims priority to U.S. Provisional Application Ser. No. 63/152,945 filed Feb. 24, 2021, the contents of which are hereby incorporated by reference in their entirety.

GOVERNMENT LICENSE RIGHTS

This invention was made with government support under grant no. 2VN5/award no. 1751472 awarded by the National Science Foundation. The government has certain rights in the invention.

TECHNICAL FIELD

The present disclosure is related to garnet-type solid-state electrolyte technology used in solid-state batteries.

BACKGROUND

The ever-burgeoning demand for portable electronic devices and electric vehicles has led to the need for high energy density lithium batteries. Lithium metal batteries (LMBs) that use a Li metal anode (highest theoretical capacity of 3860 mAh $g^{-1}$ and lowest reduction potential −3.04 V vs. SHE) can essentially meet the energy demand of the future. The use of metallic lithium in conventional LMB s, however, leads to severe chemical and mechanical instability issues due to their high reactivity with liquid organic electrolyte and propagation of Li dendrites, respectively.

An alternate approach is the use of solid-state electrolytes (SSEs) to replace organic liquid solvents that cause most of the safety issues in LMBs. The all-solid-state battery (ASSB) technology holds great promise in large-scale energy storage devices. Among different types of SSEs, candidates, such as NASICON, sulfide-based glass-electrolyte, and (Li, La)TiO$_3$ are not stable against metallic Li.

In contrast, cubic garnet-type SSE has been found to possess high lithium-ion conductivity ($10^{-3}$ S cm$^{-1}$ at room temperature), and is macroscopically stable against metallic Li. Garnet-type SSE also exhibits a wide electrochemical stability window (6V vs. Li/Li+). Although garnet-type SSE has multiple advantages, a few grand challenges hinder targeted applications. At the anode-SSE interface, microscopic investigation of the interaction between cubic garnet-type SSE and metallic Li revealed transformation of several atomic layers of cubic phase to tetragonal phase. Although mechanical stability at the cathode-SSE interface is an issue, chemical interactions at the anode-SSE interface present major problems for further development. Lithium-rich SSE surface readily reacts with moisture and carbon dioxide present in atmosphere to form lithium hydroxide (LiOH) and Li$_2$CO$_3$ on the surface. In addition, the relatively high electronic conductivity of the garnet-type SSE induces tunneling of electrons across the SSE, leading to lithium dendrite propagation.

To overcome these challenges, several approaches have been examined, including the use of: (i) Li alloy anode, (ii) hybrid electrolyte, (iii) 3-D structured anode, (iv) improved surface morphology, and (v) interface modifications. Out of the various methods used, improving surface morphology and interface modification were found to be the most effective. For obtaining a high performing cell, the surface of the garnet-type SSE should be free from any impurities prior to deposition of any buffer layer. Wet and dry polishing methods were introduced to remove Li$_2$CO$_3$ and LiOH on the surface of the garnet-type SSE to improve efficiency. However, the critical current density was still far less than required to achieve a stable full cell performance due to the tunneling of electrons across the interface. Thin film barriers at the SSE surface, including Al$_2$O$_3$, ZnO, Si, and graphitic carbon. have been reported previously to modify the surface of the garnet-type SSE, but limited cycle life performance at the full cell level demonstrates the need for further improvement. Further, interlayer-based approaches do not focus on surface chemistry of LLZT that determines the presence of surface defects and impurities, which subsequently induce dendritel. Hence, a combination of surface chemistry and interlayer-based modifications would benefit from the synergic effect of both the processes to achieve improved ASSBs.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

FIG. 1A illustrates a schematic of Ar$^+$ ion sputtering according to teachings of the present disclosure.

FIG. 1B illustrates a schematic of UHV annealing, respectively, according to teachings of the present disclosure.

FIG. 1C illustrates a step in the evolution of C and XPS spectra after UHV anneal and sputter according to teachings of the present disclosure.

FIG. 1D illustrates a step in the evolution of C and XPS spectra after UHV anneal and sputter according to teachings of the present disclosure.

FIG. 1E illustrates a step in the evolution of C and XPS spectra after UHV anneal and sputter according to teachings of the present disclosure.

FIG. 1F illustrates a step in the evolution of C and XPS spectra after UHV anneal and sputter according to teachings of the present disclosure.

FIG. 5A is an optical microscopy image of a synthesized LLZT coated LLZT obtained using a 30x lens according to teachings of the present disclosure.

FIG. 5B is an FE-SEM image of as synthesized LLZT coated LLZT according to teachings of the present disclosure.

FIG. 5C is an optical microscopy image of a synthesized h-BN coated LLZT obtained using a 30x lens according to teachings of the present disclosure.

FIG. 5D is an FE-SEM image of a synthesized h-BN coated LLZT according to teachings of the present disclosure.

FIG. 6A is a graphic illustration of galvanostatic charge/discharge of all-solid-state batteries according to teachings of the present disclosure.

FIG. 6B is a graphic illustration of a chart-discharge voltage profile of n-BN coated cleaned LLZT according to teachings of the present disclosure.

FIG. 6C is a graphic illustration of a chart-discharge voltage profile of synthesized LLZT according to teachings of the present disclosure.

FIG. 6D is a graphic illustration of XPS spectra of B1s of h-BN coated surface cleaned LZLT after cycling the battery for 102 cycles.

FIG. 6E is a graphic illustration of XPS spectra of Zr3d of h-BN coated surface cleaned LZLT after cycling the battery for 102 cycles.

FIG. 7A is a graphic illustration of an XRD pattern of the as-synthesized LLZT according to teachings of the present disclosure.

FIG. 7B is a cross-sectional FE-SEM image of LLZT according to teachings of the present disclosure.

FIG. 8 is a graphic illustration of electrochemical impedance spectroscopy of the LLZT attached with blocking electrodes according to teachings of the present disclosure.

FIG. 9 is a graphic illustration of XPS-derived $B_N$ to N atomic ratio as a function of TDMAB and NH$_3$ cycles during h-BN ALD according to teachings of the present disclosure.

FIG. 10A is a HAADF-STEM imaging of the stored LLZT in argon filled glovebox for 10 days according to teachings of the present disclosure.

FIG. 10B is an EDX elemental map of O corresponding to the stored LLZT of FIG. 10A according to teachings of the present disclosure.

FIG. 10C is an EDX elemental map of Ta corresponding to the stored LLZT of FIG. 10A according to teachings of the present disclosure.

FIG. 10D is an EDX elemental map of C corresponding to the stored LLZT of FIG. 10A according to teachings of the present disclosure.

FIG. 10E is an EDX elemental map of Zr corresponding to the stored LLZT of FIG. 10A according to teachings of the present disclosure.

FIG. 10F is an EDX elemental map of La corresponding to the stored LLZT of FIG. 10A according to teachings of the present disclosure.

FIG. 10G is an EDX elemental map of O, Ta, C, Zr, La combined corresponding to the stored LLZT of FIG. 10A according to teachings of the present disclosure.

DETAILED DESCRIPTION

Figure 2A:
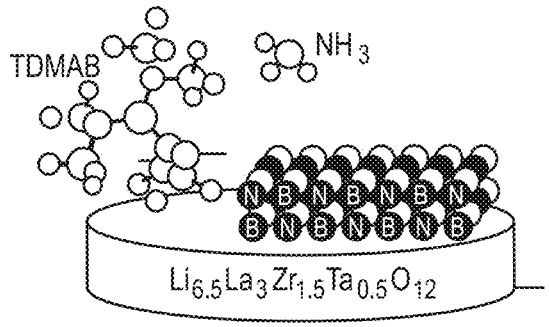
FIG. 2A is a schematic illustration of BN atomic layer deposition (ALD) using TDMAB and NH3 precursors according to teachings of the present disclosure.

The present disclosure is about the novel application of stabilizing garnet-type solid-state electrolytes and its interface in an all-solid-state battery using ultra-thin layer of h-BN coated through atomic layer deposition. Garnet-type solid-state electrolytes (SSEs) have an edge over other SSEs due to their wide electrochemical stability window, high chemical stability with metallic Li, high ionic conductivity approaching 1 mS cm$^{-1}$. However, a few grand challenges exist such as the tunneling of electrons across the electrolyte leading to the propagation of Li dendrites, high interfacial resistance, instability in the presence of moisture, low critical current density, etc. The combination of surface chemistry and interlayer-based mechanisms is to be considered to obtain a synergic effect to solve the issues of garnet-type SSEs. The mechanisms are to be considered to obtain a synergic effect to solve the issues of garnet-type SSEs. The impurities present on the surface were completely removed by two new approaches, Argon ion sputtering at 227° C. and annealing at 777° C., both in an ultra-high vacuum environment. Thorough investigation of the surface using X-ray photoelectron spectroscopy reveals a surface free of adventitious carbon and lithium carbonate layer. This was followed by a deposition of ~3 nm ultra-thin layer of h-BN using atomic layer deposition using non-corrosive precursors. The pristine garnet-type SSE was found to be highly reactive with atmosphere even with very short exposures, whereas the h-BN coating acts as a passivation layer that prevents lithium carbonate formation for over 2 months of exposure to ambient atmosphere. The interfacial resistance drastically reduces from 1145 Ω cm$^2$ to 18 Ω cm$^2$ at 60° C. A high critical current density of 0.9 mA cm$^{-2}$ and stable dendrite free Li plating/stripping have been achieved for over 200 cycles at a current density of 0.5 mA cm$^{-2}$. Further, all-solid-state battery using LiFePO$_4$ as cathode exhibited stable capacity of 130 mAh g$^{-1}$ over 100 cycles with an average coulombic efficiency of 98%. This work provides a new method to address the multiple issues associated with garnet-type SSEs to make it stable in moisture containing ambient atmosphere enabling their storage and achieve stable Li-ion transport across the electrode-electrolyte interface. Further, although the passivation layer is described herein as h-BN coated through atomic layer deposition (ALD), it is contemplated that other passivation layers of ultra-thin layered materials may be applied based on a combination of two or more of boron, carbon, and nitrogen—one of which is h-BN as discussed herein. Also, although such deposition is described herein as ALD, it is contemplated that other deposition techniques may be employed, such as chemical vapor deposition, physical vapor deposition, magnetron sputtering, plasma enhanced chemical vapor deposition, spray coating, dip coating, as examples.

The present disclosure demonstrates a combination of surface chemistry and interlayer-based approach for achieving target level performance, involving either annealing of garnet-type SSE at 777° C. in UHV or argon-ion sputtering at 227° C. to remove Li$_2$CO$_3$ contamination, followed by atomic layer deposition (ALD) of ultrathin (~3 nm) hexagonal boron nitride (h-BN). h-BN deposition using non-corrosive tris(dimethylamino)borane (TDMAB) and ammonia (NH$_3$) precursors forms a graduated BN$_x$O$_y$/BN capping barrier that protects the SSE surface against prolonged exposure to ambient and significantly improves cell performance. ALD is an attractive film deposition method for practical applications due to fact that it is a self-limiting process that produces tailored conformal coatings, with atomic-layer control of film thickness. Prior efforts utilizing ALD coatings for SSE focused on Al$_2$O$_3$ and ZnO, yielding some improvements in the wettability of SSE with molten lithium. The cycle life of the full cell, however, still remains a significant challenge. Two-dimensional (2-D) h-BN possesses unique electrical, optical and mechanical properties. The high chemical inertness of h-BN makes it stable against metallic Li, which is known for its high chemical reactivity. Among different methods of depositing h-BN, ALD has been reported to give conformal, uniform coatings with superior mechanical properties. As presented here, h-BN coating protects garnet-type SSE from moisture-induced degradation. Galvanostatic cycling at 0.5 mA cm$^{-2}$ for over 200 hours further revealed that the h-BN layer effectively suppresses the propagation of lithium dendrites by preventing the tunneling of electrons across the SSE, and also by creating a uniform lithium-ion flux that promotes homogeneous deposition of metallic Li. Further, fabrication of an all-solid-state battery demonstrates long, stable cycling performance for over 100 cycles using LiFePO$_4$ (LFP) cathode.

Experimental

Solid-state electrolyte synthesis and preparation: SSEs with nominal composition of Li$_{6.5}$La$_3$Zr$_{1.5}$Ta$_{0.5}$O$_{12}$ (LLZT) were synthesized using conventional solid-state reaction. Stoichiometric quantities of Li$_2$CO$_3$ (15 wt. % excess), La$_2$O$_3$, ZrO$_2$ and Ta$_2$O$_5$, all having, for example, a purity of >99%, were taken as starting materials in a Teflon container, along with a small quantity of 2-propanol (Sigma Aldrich, HPLC grade). This mixture was ball-milled for 8 hours before vacuum drying at 80° C. in a vacuum oven. The obtained dry powder was calcined at 900° C. for 6 hours at a heating rate of 2° C. min-1 using a muffle furnace (Thermolyne FB1315M). The resulting powder was again ball-milled for 20 hours along with 2-propanol, and then dried to get the LLZT powder. LLZT powder was then pressed into pellets using a uniaxial press (YLJ-15L, MTI Corp.). The pellets were covered with LLZT powder and sintered at 1160° C. for 16 hours in air at a heating/cooling rate of 2° C. min$^{-1}$. The obtained pellets were later polished to a thickness of 250 μm in ambient.

Vacuum chamber for surface cleaning: The LLZT pellets were introduced into a multichambered vacuum system described elsewhere. Briefly, the system consisted of an atomic layer deposition (ALD) chamber and an ultrahigh vacuum (UHV) chamber at base pressures of 9×10-8 Torr and 1×10-10 Torr, respectively. The UHV chamber is equipped with XPS, and an ion sputter gun for sample cleaning. The chambers were isolated by manually operated gate valves, and sample transfer between chambers was accomplished using a magnetically coupled feedthrough without exposure to ambient. Resistive heaters in the UHV and ALD chambers permitted sample heating up to 927° C. Temperatures were measured using a type K thermocouple mounted in proximity to the pellet. Vacuum in the UHV chamber was monitored using a nude ion gauge calibrated for $N_2$. Gas pressure in the ALD chamber was monitored using either a nude ion gauge or a baratron capacitance manometer.

$Li_2CO_3$ surface contamination was removed either by UHV annealing or sputtering in Ar+ ion environment. Details of the LLZT cleaning process have been described elsewhere8. In summary, the LLZT pellet was annealed in UHV to 777° C. in a series of steps, at a ramp rate of 1° C./min. Sputtering was achieved by back filling the UHV chamber with 5×10-5 Torr of Ar gas at a beam voltage and emission current of 3 kV, 25 mA, respectively. The sample was maintained at moderate temperatures of 27-227° C. during the sputter process.

ALD of h-BN: The cleaned LLZT pellet was transferred from the UHV chamber to the ALD chamber, without sample exposure to ambient. In situ ALD of h-BN was achieved by alternating exposures to TDMAB (Sigma Aldrich, CAS #4375-83-1, 99% purity) and electronic grade $NH_3$ (Praxair, CAS #7664-41-7, >99.999% purity) at 450° C. Although $NH_3$ gas was used without further purification, TDMAB was purified using a freeze-pump-thaw technique and distilled under vacuum into the chamber at room temperature due to its sufficiently high vapor pressure38. ALD exposures are recorded in Langmuir (L; 1 L=10-6 Torr·sec.) and have not been corrected for ion gauge sensitivity or flux to the surface. The ALD process was optimized by monitoring the saturation exposures of TDMAB and $NH_3$ on a clean LLZT pellet. Saturation dose for TDMAB was ~20.5× 107 L and $NH_3$ was ~90×107 L at 450° C. The pellets were coated on both sides with h-BN (~3 nm) and the chamber was allowed to pump down to a base pressure of 1×10-5 Torr between ALD cycles.

Ambient stability measurements: After ALD, the h-BN-capped LLZT pellet was exposed to air for 10 min, 30 min, 2 hours and 2 months at room temperature to examine its stability towards atmospheric moisture and carbon dioxide. Prior to h-BN deposition, the LLZT pellet was cleaned by annealing in UHV to 777° C. Clean LLZT had significant elemental C and negligible amount of $Li_2CO_3$ contamination prior to ambient exposures. After each exposure, the sample was transferred into the UHV chamber for XPS spectral acquisition.

Dendrites/Symmetrical cell: Li|BN/LLZT|Li symmetrical cells were constructed by placing Li foils (Alfa Aesar) on both sides of the h-BN/LLZT pellet and heating at 220° C. for 1 hour after placing a load of 6 stainless spacers on the top side. Samples coated on both sides with h-BN by ALD (~3 nm on each side) was used for the fabrication of the symmetrical cell. Custom-constructed Swagelok-type cells with spring on one end to apply pressure were used for assembling the cell. The cells were double sealed with Teflon tape to prevent any leakage of air when removed from the glove box. Galvanostatic plating/stripping of lithium metal was done at constant current with time limitation.

Full Cell Preparation: An LiFePO$_4$| h-BN/LLZT|Li all-solid-state battery was constructed for galvanostatic cycling experiments. A lithium metal anode was attached with the h-BN/LLZT pellet as mentioned in the symmetrical cell assembly. The cathode composite consists of 7:7:4:2 ratio of active material, LLZT powder, super-P carbon, and polyvinylidene difluoride (PVDF) binder. Cathode composite components were converted to slurry in n-methyl-2-pyrrolidone (NMP) solvent. This material was coated onto the h-BN coated LLZT pellet using an OHP sheet inside the glovebox and was attached with a stainless-steel current collector when the slurry was semidry. This setup was further dried in vacuum using the antechamber present in the glovebox at 90° C. for 12 hours. The full cell setup was transferred to custom made Swagelok cell that can apply a pressure of 126 kPa. Galvanostatic cycling was carried out from 2.8 V to 4 V at 0.2 C rate, while the cell was maintained at 60° C. in a hot air oven. The cathode loading was 8-9 mg cm$^{-2}$.

Material Characterization and Electrochemical Measurements:

X-ray diffraction (XRD) analysis was performed using a D2 Phaser, Bruker, using a Cu Kα (1.5418 Å) radiation source. Field emission scanning electron microscopy (FE-SEM) images were obtained from JSM 7600, JOEL instrument. Biologic SP-150 potentiostat was used for the electrochemical impedance spectroscopy analysis in the frequency range of 7 MHz-1 mHz. An Arbin 36 channel cycler was used for the galvanostatic cycling experiments. The electrochemical cell preparation was carried out in a mbraun argon-filled glovebox that was maintained at O2<0.5 ppm and H2O<0.1 ppm. XPS analysis was performed using a PHI Physical Electronics dual anode non-monochromatic x-ray source, equipped with a hemispherical analyzer of a mean radius of 100 mm and a multichanneltron detector. The spectra were acquired using Al Kα (1486.6 eV) radiation, operated at 300 W and 15 kV, and with the analyzer operating at a constant pass energy of 50 eV. All photoemission binding energies were calibrated to the La 3d5/2 feature at ~834.7 eV, instead of referencing to adventitious C38. The spectra were analyzed using commercially available software with capabilities for Shirley background subtraction, and the peaks were fit using Gaussian-Lorentzian functions37. Average film thicknesses were calculated using inelastic mean free path (IMFP) lengths through the BN overlayer; 37.27, 30.05 and 34.42 Å for Li 1s, N 1s and B 1s photoelectrons, respectively. The IMFP lengths were calculated using TPP-2M IMFP predictive equation40. The relative atomic concentrations were estimated from the ratios of core level XPS intensities as modified by atomic sensitivity factors but not corrected for IMFP. Most XPS spectra were acquired with the analyzer aligned with the sample normal ("normal emission"). Some spectra, however, were acquired at a shallower take-off angle with the analyzer aligned at 600 with respect to the sample normal ("shallow emission") which decreases the effective IMFP, and therefore the sampling depth, by ~50%37, thus increasing surface sensitivity.

Results and Discussion

LLZT Synthesis and Characterization:

Garnet-type SSE with nominal composition, $Li_{6.5}La_3Zr_{1.5}Ta_{0.5}O_{12}$ (LLZT) was synthesized by conventional solid-state synthesis. Ta doped LLZT was selected because of its better cubic phase stability at room temperature and the higher lithium-ion conductivity compared to the undoped system. The formation of the cubic phase of the LLZT was confirmed through XRD measurements. As shown in FIG. 7A, the XRD pattern matched with the cubic phase of $Li_5La_3Nb_2O_{12}$ (JCPDS: 80-0457) that confirms the formation of cubic phase of LLZT. Li-ion conductivity of the synthesized LLZT was calculated through EIS measurements of the LLZT attached with blocking electrodes on both sides of the pellet (FIG. 8). A conductivity of 1.1 mS cm$^{-1}$ was obtained at 60° C., which matches with the reported values41. Cross-sectional FE-SEM image (FIG. 7B) shows dense morphology with very minimal voids and the average grain size was found to be 13 μm. The relative density of the LLZT pellet was calculated to be 93%.

LLZT Surface Cleaning to Remove Surface Impurities and Contaminants

As-synthesized LLZT pellets displayed significant carbonate, adventitious carbon, and hydroxide contamination. This contamination not only shifted the XPS binding energies of core levels such as Li 1s, Ta 4f, O 1s and C 1s regions but also masked the visibility of La and Zr precursors used in LLZT preparation (not shown). The pellets were either annealed in UHV to 777° C. or sputtered in Ar$^+$ environment at 27-227° C. to remove contamination primarily in the form of $Li_2CO_3$. A schematic of the Ar$^+$ ion sputtering and UHV annealing is depicted in FIGS. 1A and 1B, respectively, and the detailed analysis of garnet cleaning has been described elsewhere. FIGS. 1C-F display the evolution of C 1s and Li 1s XPS spectra after UHV anneal and sputter cleaning procedures. UHV annealing to 777° C. in FIG. 1C shows a decrease in the C 1s intensity at 290.2±0.4 eV corresponding to carbonate species and a subsequent increase in intensity at ~285 eV. This broad, asymmetric carbon feature at lower binding energies can be resolved into two components corresponding to adventitious C at ~284.8 eV and alkoxide ($CH_xO_y$) contamination at ~287.4 eV. This decrease in C 1s intensity at higher binding energies and a subsequent increase at lower binding energies demonstrate that carbonate is being reduced to lower C oxidation states such as alkoxides ($C_xH_yO_z$) and hydrocarbons ($C_xH_y$) or adventitious C after the UHV anneal. Indeed, the melting point of $Li_2CO_3$ is ~727° C. consistent with some decomposition of $Li_2CO_3$ after annealing to 777° C. The XPS-derived atomic concentrations of carbonate, adventitious C and alkoxides were approximately 4.4 at. %, 13.5 at. % and 2.4 at. % respectively, after the final 777° C. anneal. In contrast, the C 1s XPS spectra obtained after 17 hours of Ar$^+$ sputtering at 27-227° C. (FIG. 1D), indicates complete removal of lower binding energy C, with a negligible amount of $Li_2CO_3$ species left on the surface at ~290.7 eV. This data demonstrates that pristine LLZT can be achieved by sputtering at mild temperatures and the amount of $Li_2CO_3$ left on the surface was ~1±1 at. %.

The mechanism for $Li_2CO_3$ removal by Ar$^+$ ion sputtering is clearly different from that of the UHV anneal method. Here, $Li_2CO_3$ does not convert into lower C oxidation states. Instead, the $Li_2CO_3$ layer is being etched off during sequential sputter steps. The etching process starts with a complete removal of top surface contaminants like adventitious C and hydrocarbons at lower binding energies, within the first 2 hours of sputtering. This is followed by almost complete removal of $Li_2CO_3$ even at low temperatures. The Li 1s spectra in FIG. 1E indicates a reduction in the Li 1s intensity and broadening towards lower binding energies after the UHV anneal. This reduction in intensity corresponds to some melting and decomposition of $Li_2CO_3$. The appearance of a new shoulder at lower binding energies of ~53.6 eV corresponds to metallic Li (Li$^0$) feature. The well-resolved Li 1s feature after the anneal can be deconvoluted into residual $Li_2CO_3$, $Li_2O$ and Li$^0$ at 56.8 eV, 55.8 eV and 53.6 eV respectively. However, the presence of some LiOH within the broad $Li_2O$ peak at ~55.8 eV cannot be ruled out. The appearance of Li oxide and metallic Li denotes the reduction of $Li_2CO_3$ into lower Li oxidation states during the anneal process. The Li 1s spectra after sputtering in FIG. 1F also shows a decrease in intensity, similar to FIG. 1E. Etching removed the $Li_2CO_3$ top layer revealing the underlying $Li_2O$ and metallic Li features. Both sputter and anneal techniques also resolved the XPS spectra of O 1s, Zr 3d, La 3d and Ta 4f which were initially obscured by a thick $Li_2CO_3$ top layer (not shown).

Figure 2B:
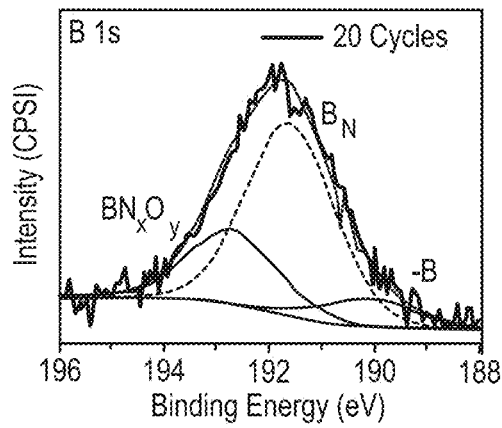
FIG. 2B illustrates a step in the evolution of B 1s XPS during ALD, deconvoluted B 1s after 20 TDMAB/NH$_3$ exposures on LLZT at 450° C., angle-resolved XPS of B 1s after 11 TDMAB/NH$_3$ exposures at 90° (purple trace) and 60° (red trace) emission angles, and N 1s XPS during ALD, respectively, according to teachings of the present disclosure.

ALD of h-BN on LLZT h-BN was deposited in-situ on a clean LLZT pellet by alternating TDMAB and $NH_3$ exposures at 450° C. schematically shown in FIG. 2A. FIGS. 2B-2E display the evolution of B 1s and N 1s XPS spectra during the ALD of BN. FIG. 2B shows an increase in the B 1s intensity with increasing number of TDMAB/NH3 cycles, up to 20 cycles. The XPS spectra show a broad B 1s boron feature with a FWHM of ~2.5±0.1 eV, suggesting the decomposition or reaction of some TDMAB precursor under the conditions employed, resulting in multiple bonding environments. The B 1s feature in FIG. 2B also shows a shift in the binding energy from 192 eV to 191.7 eV upon increasing the number of cycles between 3 and 20 cycles, respectively.

Figure 2C:
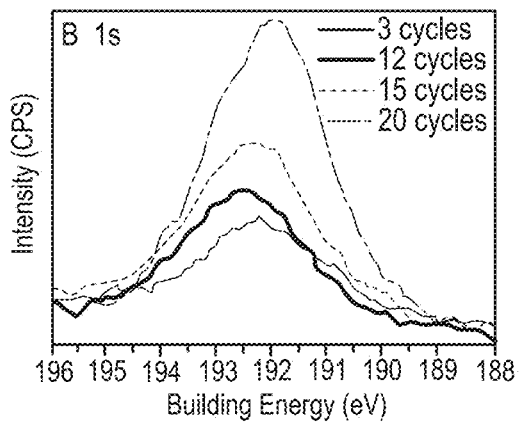
FIG. 2C illustrates a step in the evolution of B 1s XPS during ALD, deconvoluted B 1s after 20 TDMAB/NH$_3$ exposures on LLZT at 450° C., angle-resolved XPS of B 1s after 11 TDMAB/NH$_3$ exposures at 90° (purple trace) and 60° (red trace) emission angles, and N 1s XPS during ALD, respectively, according to teachings of the present disclosure.

To better understand the various bonding environments of boron species, B 1s was deconvoluted into three components after 20 cycles by constraining the full width at half maximum (FWHM) to be equal and ≤2 eV (FIG. 2C). The components at 192.7 eV, 191.6 eV and 190.1 eV correspond to boron oxynitrides ($BN_xO_y$), boron nitride (BN) and dangling boron bonds (—B) respectively. The presence of boron oxynitride at a higher binding energy indicates the reaction of TDMAB precursor with a heavily oxidized LLZT surface. A similar observation of boron oxide ($B_2O_3$) formation was made during BN deposition on Li-Al-Ti-phosphate (LATP), using a chemical vapor deposition approach. The data in FIGS. 2B and 2C indicate that boron oxide may have been converted into boron oxynitride due to oxygen-nitrogen exchange reactions, in the presence of excess $NH_3$ exposures. The presence of dangling boron bonds at ~190.1-189.5 eV also indicates TDMAB decomposition at elevated substrate temperatures. It should be noted that the intensity of the component at 191.6 eV is much greater than the combined intensities of $BN_xO_y$ and dangling B components, demonstrating that most of the film growth is in the form of BN, due to significant nitridation using $NH_3$ precursor.

Figure 2D:
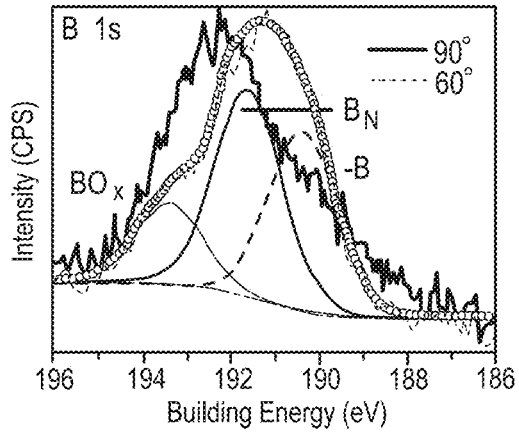
FIG. 2D illustrates a step in the evolution of B 1s XPS during ALD, deconvoluted B 1s after 20 TDMAB/NH$_3$ exposures on LLZT at 450° C., angle resolved XPS of B 1s after 11 TDMAB/NH$_3$ exposures at 90° (purple trace) and 60° (red trace) emission angles, and N 1s XPS during ALD, respectively, according to teachings of the present disclosure.
Figure 2E:
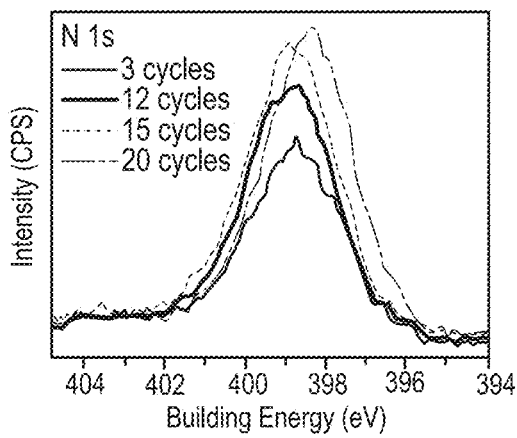
FIG. 2E illustrates a step in the evolution of B 1s XPS during ALD, deconvoluted B 1s after 20 TDMAB/NH$_3$ exposures on LLZT at 450° C., angle resolved XPS of B 1s after 11 TDMAB/NH$_3$ exposures at 90° (purple trace) and 60° (red trace) emission angles, and N 1s XPS during ALD, respectively, according to teachings of the present disclosure.

$B_2O_3$ and $BN_xO_y$ are unstable in air. Exposure of such films to ambient results in volatile boric acid formation. Therefore, in one exemplary embodiment, the BN film is on top of the $BN_xO_y$ layer, passivating both the oxynitride and the LLZT pellet. In order to determine the layer distribution, take-off angle resolved XPS spectrum was acquired after 11 TDMAB/NH3 cycles at a shallow emission geometry, with the analyzer aligned at 60° from the surface normal. FIG. 2D compares B 1s XPS acquired at normal and shallow emission geometries. At 60° emission, the B 1s spectrum includes an intense BN peak at ~191.6 eV and a small shoulder at ~193.3 eV corresponding to $BO_x$ bonds. Since 60° emission is more surface sensitive than normal emission, the data in FIG. 2D confirms that BN forms the top layer with $BN_xO_y$ interface. The presence of such interfacial layer along with dangling B atoms is indeed beneficial for Li-ion conductivity since the presence of such vacancies and defect sites aid in Li transport and improve the overall performance of the battery. The corresponding N 1s XPS spectra in FIG. 2E show an increase in intensity and a shift in binding energy from 398.8 to 398.4 eV after 20 TDMAB/NH$_3$ cycles at 450° C. The N 1s peak can also be deconvoluted into two components at ~398 eV and ~399 eV, corresponding to BN and $BN_xO_y$, respectively.

Figure 2F:
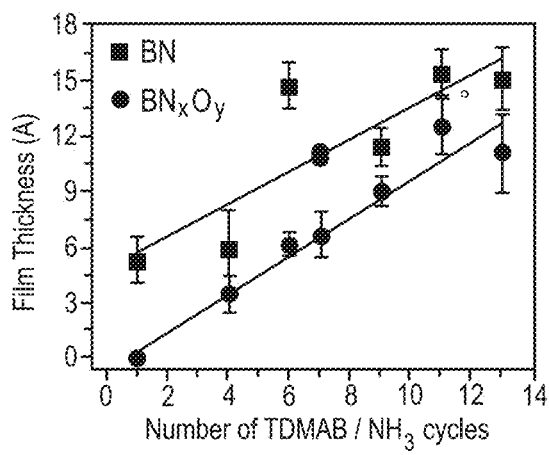
FIG. 2F is a graphic illustration of XPS-derived thicknesses of BN (black squares) and $BN_xO_y$ (red circles) as a function of TDMAB/NH3 cycles according to teachings of the present disclosure.

The evolution of XPS-derived average BN and $BN_xO_y$ film thicknesses as a function of the number of TDMAB and $NH_3$ cycles is shown in FIG. 2F. The corresponding BN to N atomic ratios are displayed in FIG. 9. FIG. 2F shows a linear, ALD-type growth of BN and $BN_xO_y$ layers with growth rates of ~1.1 A/cycle and ~0.85 A/cycle, respectively. These data demonstrate that thicker BN layers can be deposited using TDMAB/NH3 precursors with limited $BN_xO_y$ interfacial layer. The ratio of atomic concentrations of BN to N, corrected by atomic sensitivity factors, is displayed in FIG. 9. This data demonstrates the formation of stoichiometric h-BN films with a BN to N ratio of 1:1 ratio, using TDMAB and $NH_3$ at 450° C.

Degradation of LLZT During Storage

Figures 3A, 3B, 3C:
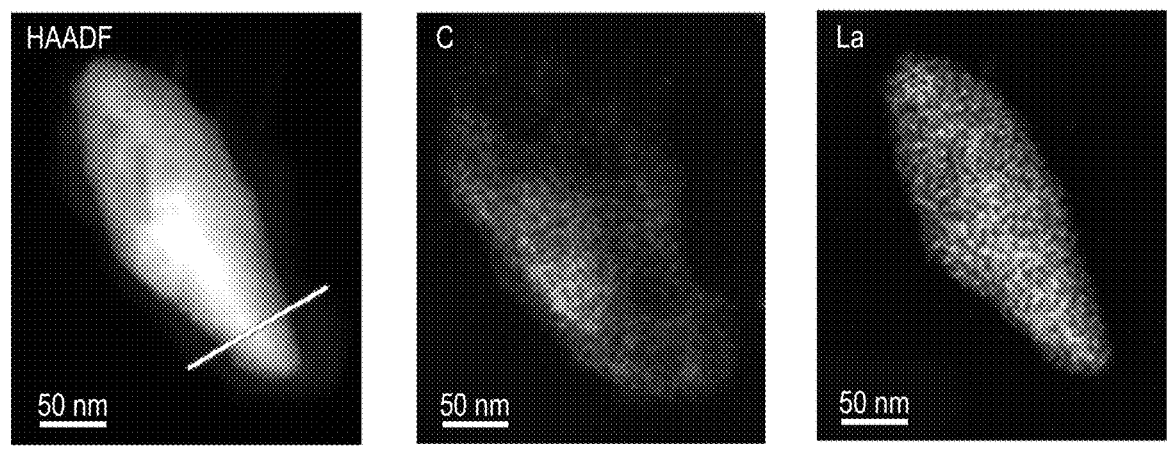
FIG. 3A is HAADF-STEM imaging of the 10-day stored LLZT in argon filled glovebox according to teachings of the present disclosure.
FIG. 3B is an EDX elemental map of C corresponding to the HAADF-STEM imaging of FIG. 3A according to teachings of the present disclosure.
FIG. 3C is an EDX elemental map of C/La/Zr corresponding to the HAADF-STEM imaging of FIG. 3A according to teachings of the present disclosure.
Figure 3D:
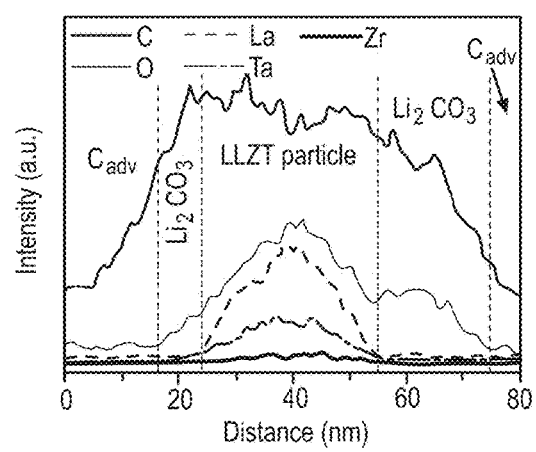
FIG. 3D is an EDX line scan of C, La, Zr, O, and Ta corresponding to the HAADF-STEM imaging of FIG. 3A according to teachings of the present disclosure.

The as-synthesized LLZT powder was stored in an argon glovebox with $O_2$<1.2 ppm, $H_2O$<0.1 ppm for 10 days, and this powder was analyzed through high-angle annular dark-field scanning transmission electron microscopy (HAADF-STEM). As seen in FIG. 3A, a thick amorphous layer of 2 to 10 nm could be observed surrounding the LLZT particle. This was further analyzed through energy dispersive x-ray (EDX) analysis (FIGS. 3B and 3C and FIGS. 10A-10G, where the amorphous layer was found to be composed of carbon in most of the regions and some regions also showed the presence of oxygen atoms. The region where both oxygen and carbon signals are present corresponds to $Li_2CO_3$ and the carbon signal alone can be attributed to the accumulation of the adventitious carbon layer during storage. Further, the EDS line profile was obtained over the line marked in FIG. 3A and is shown in FIG. 3D. The existence of La, Ta and Zr along with carbon and oxygen can be attributed to the LLZT particle and the surrounding the particle, the immediate environment consists of both C and O signal which may correspond to $Li_2CO_3$, LiOH and adventitious carbon layer. Beyond this layer, there is only the C signal that correspond to the adventitious carbon layer accumulation during storage. These results evidence the degradation of the LLZT in such ultra-low concentrations of moisture, proving the extent of reactivity of the garnet samples, and the difficulty in storage of such solid-state electrolytes, both in powder and pellet forms. Further, formation of impurities around LLZT will surely have a detrimental effect during lithium-ion propagation, promoting the formation of lithium dendrites. It is worth mentioning that dendrite propagation takes place through such defect sites and impurities in an SSE as illustrated through nanoindentation on single-crystal garnets by Swamy et al. Hence, it is imperative to remove any such impurity layers formed on the LLZT pellet surface using methods as mentioned above and the defect free surface needs to be protected from further degradation when exposed to moisture containing atmosphere.

Atmospheric Exposures of Pristine LLZT

Figure 3E:
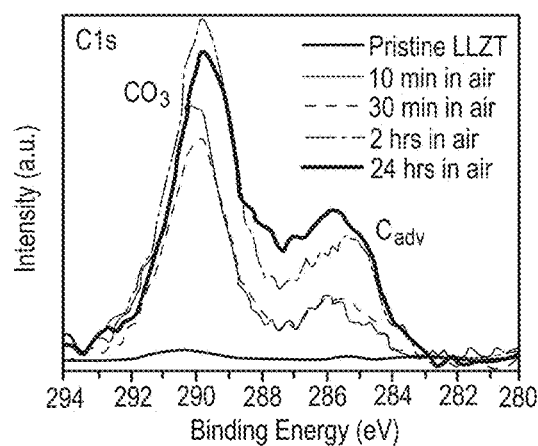
FIG. 3E is a graphic illustration of the evolution of C 1s during the ambient exposure of surface cleaned LLZT at different intervals according to teachings of the present disclosure.
Figure 11A:
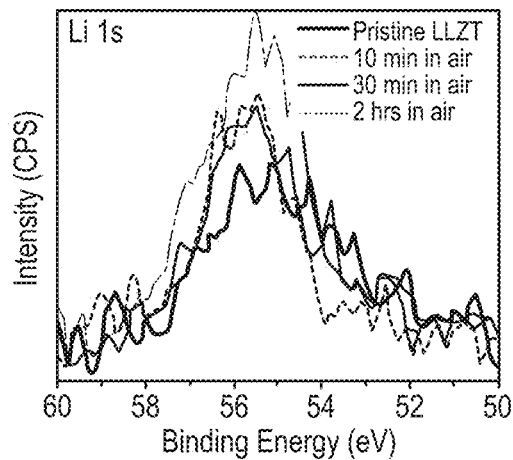
FIG. 11A is a graphic illustration of the evolution of Li 1s XPS during ambient exposures of pristine LLZT at different time durations according to teachings of the present disclosure.
Figure 11B:
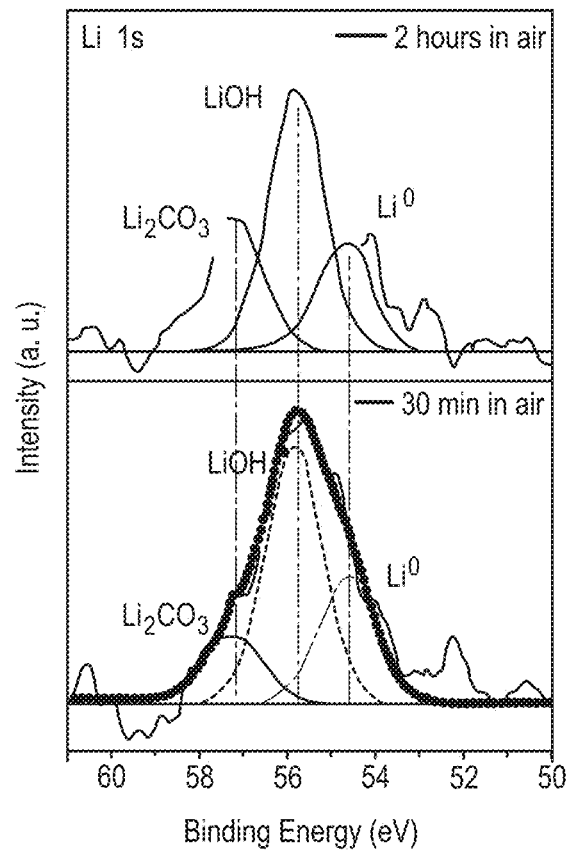
FIG. 11B is a graphic illustration of deconvoluted spectra corresponding to the graphic illustration of FIG. 11A according to teachings of the present disclosure.
Figure 12:
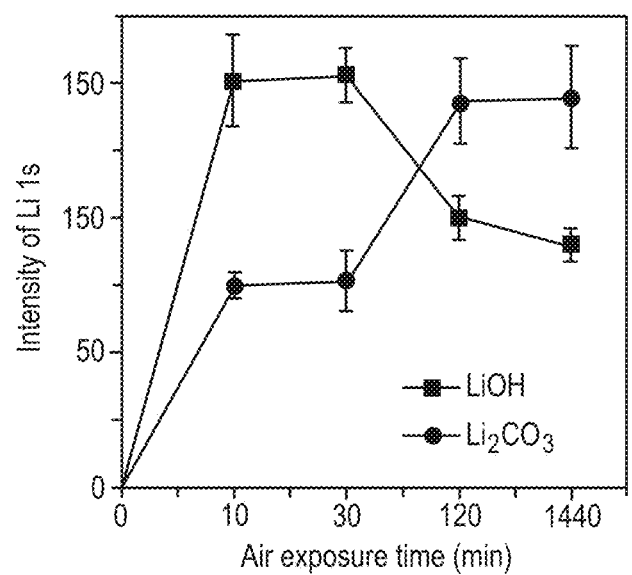
FIG. 12 is a graphic illustration of the increase in intensity of Li 1s with the exposure to ambient according to teachings of the present disclosure.

Pristine garnet was exposed to air for 10 min, 30 min, 2 hours and 24 hours, after it was sputter cleaned to remove all forms of surface C8. FIGS. 3E and 10A-10G display the XPS of C 1s, Li 1s and deconvoluted Li 1s spectra during sequential air exposures at room temperature. The C is XPS spectra in FIG. 3E shows a significant increase in intensity at ~290.1 eV after 10 min of air exposure, and a small amount of C buildup was observed at lower binding energies. The C 1s feature at ~290.1 eV corresponds to $Li_2CO_3$ and the feature at lower binding energies can be assigned to adventitious C at ~285.5 eV and alkoxide ($CH_xO_y$) at ~287.3 eV. Subsequent exposures resulted in a slight attenuation followed by an increase in the $Li_2CO_3$ intensity at ~290.1 eV after 30 min and 2 hours in air, respectively. The $Li_2CO_3$ intensity attenuated further during 24 hours of exposure. However, adventitious C and alkoxide features in FIG. 3E and the O 1s XPS (not shown), indicated a gradual increase in intensity throughout air exposures. The data demonstrate that $Li_2CO_3$ formation saturated in the first 2 hours of LLZT exposure to ambient. FIG. 11A displays the overlaid Li 1s spectra after 0 min (pristine LLZT), 10 min, 30 min, 2 hours, and 24 hours of air exposure. Li 1s shows an increase in intensity and shift to higher binding energy after 10 min in ambient. There was a negligible change in Li between 10- and 30-min exposure times. Increasing exposure time to 2 hours resulted in the appearance of a shoulder at a much higher binding energy (FIG. 11A). However, Li 1s remains unchanged during the 24-hour mark. To better understand the binding energy shifts in Li, the spectra were deconvoluted after 30-min and 2-hour exposures in FIG. 11B. The deconvolution was performed by constraining the FWHM of all components to be equal to 1.5 eV. FIG. 11B shows the presence of three components corresponding to $Li_2O$, LiOH and $Li_2CO_3$ at ~54.6 eV, ~55.8 eV and ~57.2 eV, respectively. It is evident from the deconvolution that the intensity of LiOH component is greater than $Li_2CO_3$ during the first 30 min of exposure, as shown in the plot between intensity and exposure time, FIG. 12 (Supplemental Information). But after 2 hours, the $Li_2CO_3$ shoulder at ~57.2 eV increased significantly (FIG. 11B). The data in FIGS. 11A and 11B further demonstrate that all $Li_2CO_3$ was formed within the first 2 hours of exposure, with no further increase in the shoulder feature at ~57.2 eV during subsequent exposures to air. Since no significant change in the C 1s and Li 1s spectra was observed during the 24 hours mark, it is safe to conclude that all $Li_2CO_3$ was formed within the first 2 hours of LLZT exposure to air.

Atmospheric Stability of h-BN Coated LLZT

Figure 3F:
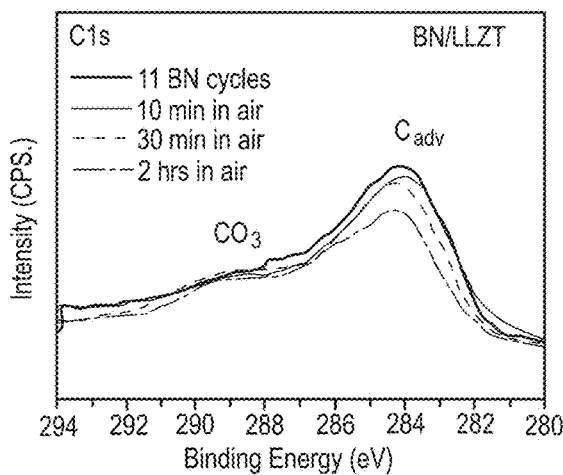
FIG. 3F is a graphic illustration of XPS spectra of C1s of hexagonal boron nitride (h-BN) coated surface cleaned LZLT with ambient exposure for different exposure time according to teachings of the present disclosure.
Figure 3G:
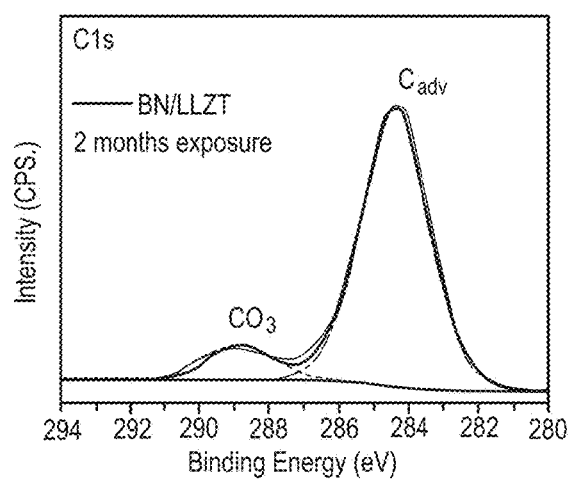
FIG. 3G is a graphic illustration of XPS spectra of C1s of h-BN coated surface cleaned LZLT with ambient exposure for different exposure time according to teachings of the present disclosure.

The chemical stability and structural integrity of h-BN coated garnets was examined by exposing the h-BN/LLZT heterostructures for 10 min, 30 min 2 hours and 2 months to ambient. The LLZT used for this experiment was annealed in UHV to 827° C. to remove $Li_2CO_3$ contamination prior to h-BN deposition. After the initial anneal treatment, the sample had some adventitious C contamination at ~284.5 eV and a small amount of residual carbonate at ~288.6 eV. The XPS spectra of C 1s, Li 1s, B 1s and N 1s regions acquired during air exposures are displayed in FIGS. 3F, 3G, and 13. The C 1s spectra in FIG. 3F shows a gradual attenuation in the adventitious C feature at 284.5 eV after 10 min, 30 min and 2 hours of air exposure at room temperature. A small shoulder at ~288.7 eV begins to appear after 10 min and 30 min of air exposure, which further attenuates during the subsequent 2 hours of exposure. This shoulder corresponds to carboxylate species ($COO^-$) which binds at a slightly lower binding energy than lithium carbonate (~290.8 eV). Such carboxylate contamination was also observed after ambient exposure of $Al_2O_3$ capped LLCZN. FIG. 3G displays C 1s XPS spectrum after 2 months of air exposure. A significant amount of C buildup was seen at lower binding energies of ~284.5 eV corresponding to adventitious C and hydrocarbon contamination with a small shoulder at ~288.7 eV corresponding to carboxylate functionality (FIG. 3G). This data therefore demonstrates that $Li_2CO_3$ does not form on BN-coated LLZT even after 2 months of ambient exposure.

Figure 13A:
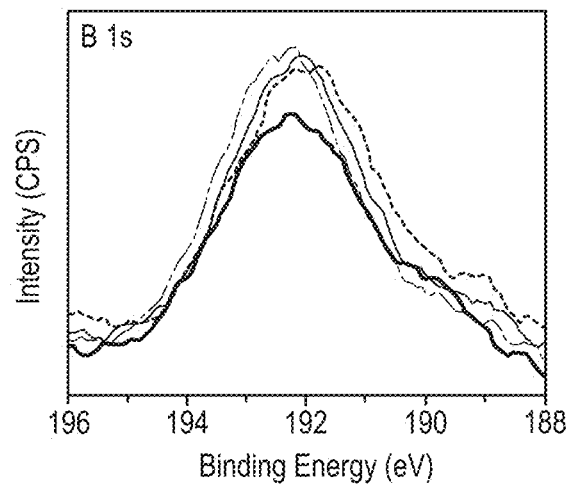
FIG. 13A is a graphic illustration of the evolution of B 1s with different exposures of BN/LLZT to ambient atmosphere according to teachings of the present disclosure.
Figure 13B:
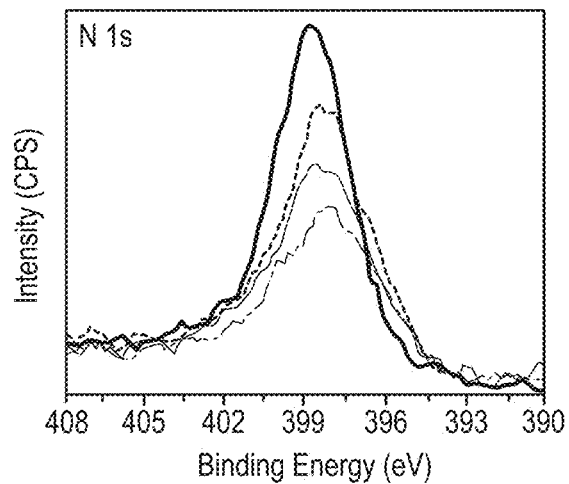
FIG. 13B is a graphic illustration of the evolution of N 1s with different exposures of BN/LLZT to ambient atmosphere according to teachings of the present disclosure.
Figure 13C:
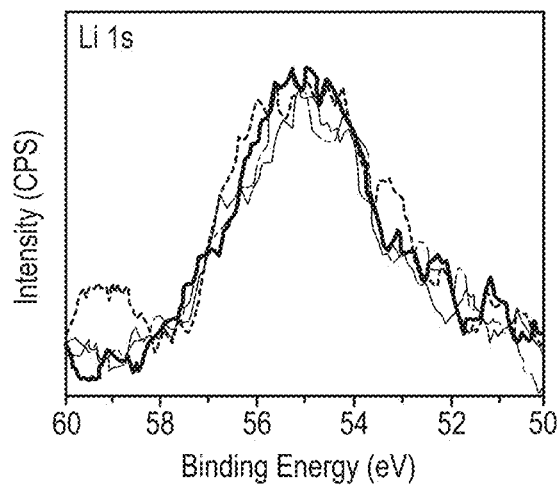
FIG. 13C is a graphic illustration of the evolution of Li 1s with different exposures of BN/LLZT to ambient atmosphere according to teachings of the present disclosure.
Figure 14:
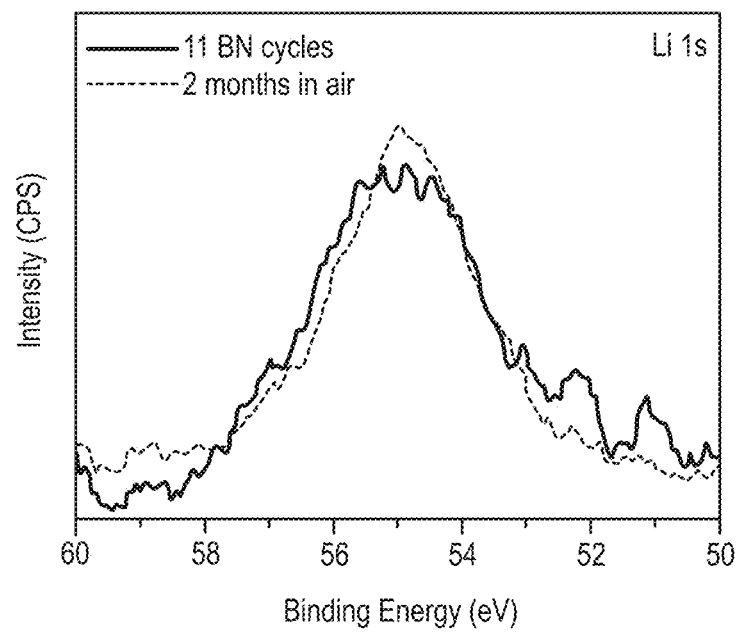
FIG. 14 is a graphic illustration of Li 1s XPS spectra after exposure of BN/LLZT for 2 months to ambient atmosphere according to teachings of the present disclosure.

XPS of the B 1s feature in FIG. 13A shows a small increase in intensity with increasing exposure times. This suggests some oxidation or hydroxylation of the boron in BN or $BN_xO_y$ layers. However, the B 1s spectrum shows the presence of boron even after 2 months of air exposure indicating that boron remains intact on the surface and is not lost in the form of volatile boric acid. FIG. 13B shows a significant decrease in the N 1s intensity and slight shift in binding energy from 398.7 eV to 398.4 eV, with increasing exposure times. The loss in N 1s intensity at higher binding energies may indicate some desorption of N in the form of volatile $NH_x$ or $NO_x$ species. Similar nitrogen loss is observed upon the exposure of $BN/B_2O_3$/Si to air 55 and h-BN/Ir films to atomic oxygen at room temperature. N-H bonds arise from the unreacted $NH_3$ and are necessary for the edge termination of BN. Another study showed that BN films deposited using $NH_3$ precursor result some H incorporation into the growing BN film. The Li 1s spectrum in FIG. 13C demonstrates only a slight attenuation after 2 hours in air and a subsequent increase in intensity during 2 months of storage. The apparent increase in intensity after 2 months is consistent with a de-attenuation of the Li 1s intensity corresponding to the desorption of some N from the $BN/BN_xO_y$ film. FIG. 13C also shows no shift in the binding energy of Li 1s suggesting lithium hydroxide or lithium carbonate formation.

The results in FIGS. 3F, 3G, and 13 demonstrate that although the N sites in the $BN/BN_xO_y$ cap are affected during ambient exposures, no lithium carbonate is formed even after 2 months of storage in air. These results demonstrate that ~3 nm of $BN/BN_xO_y$ coating efficiently protected the LLZT surface from atmospheric moisture and prevented $Li_2CO_3$ and LiOH formation. In addition, such N vacancies could be beneficial to Li-ion transport since (electrochemical) conduction in SSEs occur through vacancies and defect sites. Recent studies also show that nitrogen in BN can be restored by heating in $N_2$ atmosphere at >427° C.70. The effective passivation of the LLZT electrolyte from moisture induced degradation can be attributed to the superior chemical inertness and hydrophobic property of the h-BN as demonstrated previously using exfoliated h-BN nanosheets. In the case of the h-BN nanosheets, there is a chance that moisture may penetrate through the grain boundaries to reach the LLZT surface, which exhibited a slight increase in the carbonate level. However, as in our case, h-BN deposited through growth techniques directly on the LLZT present no such grain boundaries that effectively passivated the surface from further degradation.

Figure 4A:
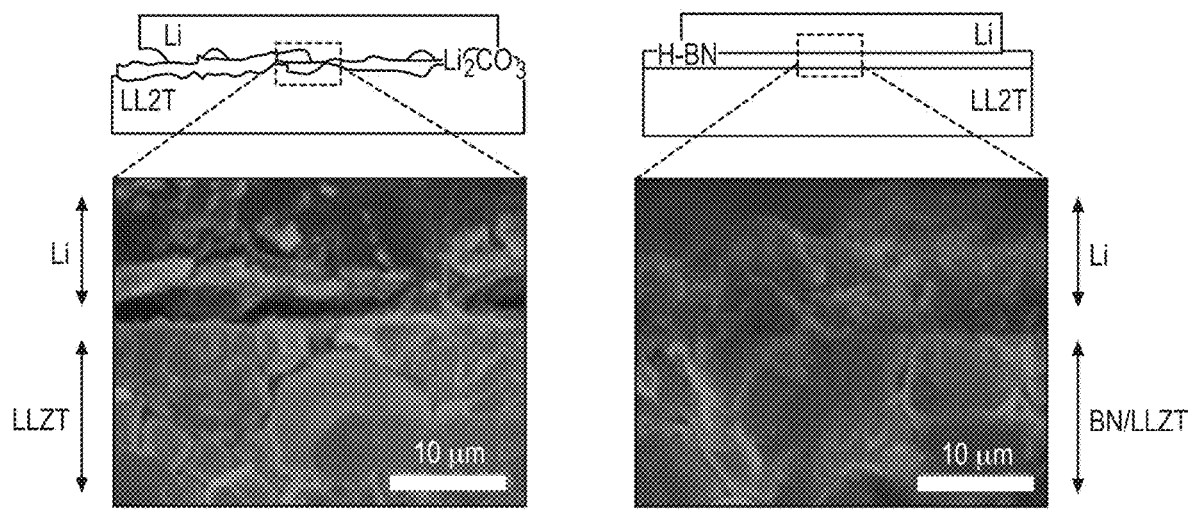
FIG. 4A illustrates surface wetting property of metallic Li with as synthesized LLZT and the h-BN coated surface cleaned LLZT according to teachings of the present disclosure.

Surface Wetting Properties and Symmetrical Cell Studies:

A thin Li foil was placed on the pellet above which 6 stainless steel spacers were placed and heated at 220° C. for 1 hour to study the wettability of pellets with metallic lithium. For the as synthesized LLZT, as shown in FIG. 4A, only a small area of Li 1s in contact with the LLZT pellet demonstrating poor wetting characteristics with Li. A large gap of about 1-3 μm separate the Li and the LLZT that may lead to very high polarization and interfacial resistance. In contrast, BN-coated LLZT demonstrated very high adhesion to metallic Li. No presence of voids and gaps could be observed in the FE-SEM image, proving the high wettability of such surfaces with Li. This high adhesion is due to the synergistic effect of sputtering process which produces ultra-clean LLZT surfaces, free of $Li_2CO_3$ and LiOH, that are lithophobic in nature. Ultra-thin (~3 nm) h-BN also improves the wettability of Li through weak Lewis-acid base interactions.

Figure 4B:
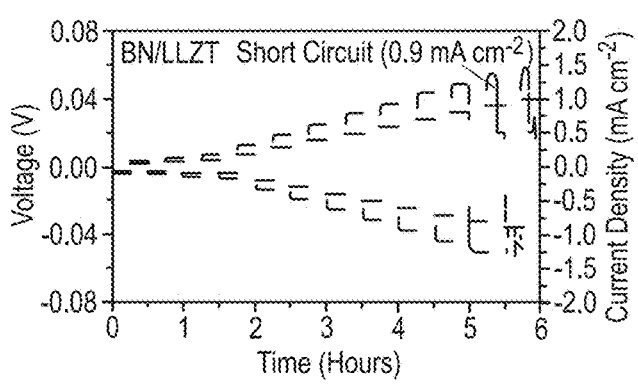
FIG. 4B illustrates critical current density measurement using BN/LLZT electrolyte according to teachings of the present disclosure.
Figure 4C:
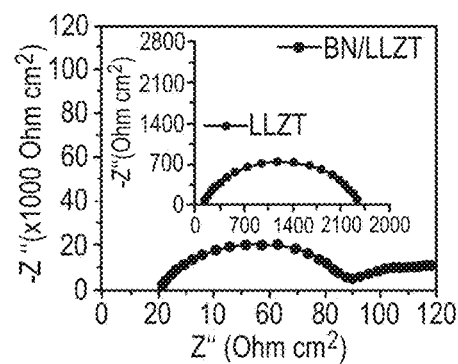
FIG. 4C illustrates EIS measurements of symmetrical cells according to teachings of the present disclosure.
Figure 15:
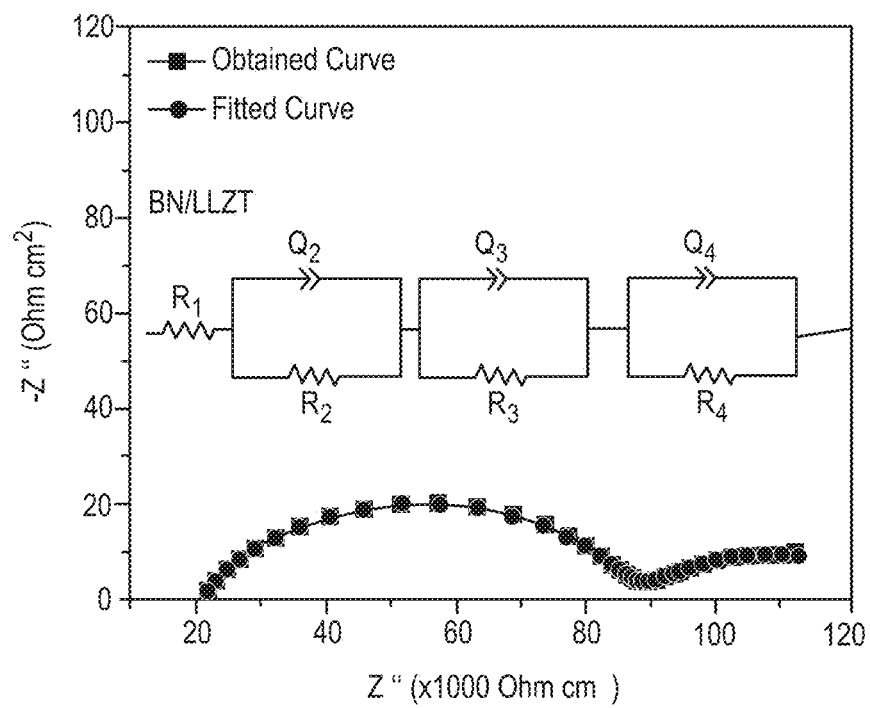
FIG. 15 illustrates curve fitting of the EIS spectra of BN/LLZT symmetrical cell and its corresponding equivalent circuit according to teachings of the present disclosure.

Li|LLZT|Li symmetrical cells were made using the same method mentioned in the previous section. These symmetrical cells were transferred to a custom-made Swagelok cell that can apply a pressure of 126 kPa. Interfacial resistance was evaluated using electrochemical impedance spectroscopy (EIS) measurements of the symmetrical cell at 60° C., as shown in FIG. 4C. The obtained EIS plot was curve-fitted using the equivalent circuit, "R1+R2/Q2+R3/Q3+R4/Q4", in FIG. 15, where R1, R2, R3 and R4 are solution resistance, bulk resistance, grain boundary resistance, and interfacial resistance, respectively. As two identical interfaces are involved, R4 was divided by two to get the actual interfacial resistance. An ultra-low interfacial resistance of 18 Ω cm2 was achieved at 60° C. for the h-BN coated LLZT cell, owing to the highly uniform contact of the metallic Li with LLZT. On the other hand, the EIS of the as-synthesized LLZT cell cannot be distinguished into individual components, and the values of bulk and grain boundary resistances were obtained from the BN/LLZT pellet. The simulation results showed a very large interfacial resistance of 1145 Ω cm2 resulting from poor interfacial contact between Li and LLZT. Interfacial resistance obtained from BN-coated LLZT is indeed one of the lowest values achieved to date. Although Han et al. reported an interfacial resistance of 1 Ω $cm^2$ for an $Al_2O_3$-coated $Li_7La_{2.75}Ca_{0.25}Zr_{1.75}Nb_{0.25}O_{12}$, the measurement was made by extrapolating d.c. cycling results and not measured directly using EIS. Further, $Al_2O_3$ forms a Li—Al alloy that may not prevent the electron tunneling across the interface, which is the reason for the propagation of Li dendrites.

Figure 4D:
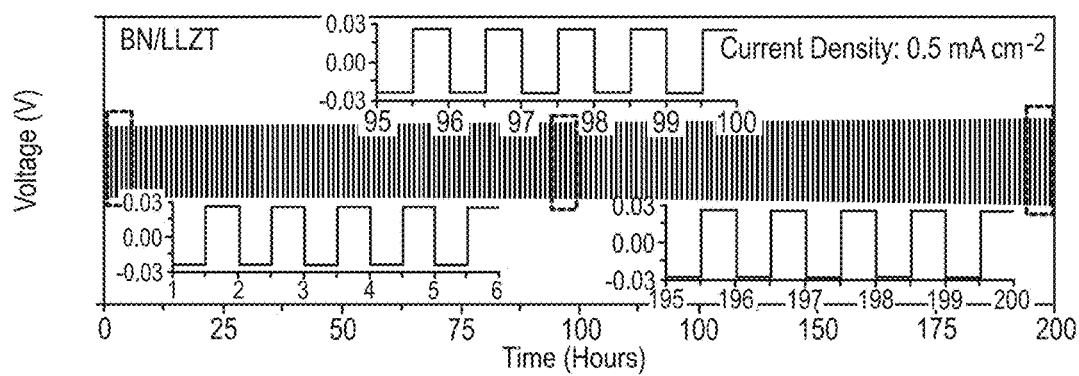
FIG. 4D illustrates galvanostatic cycling of the symmetrical cell at a current density of 0.5 ma cm$^{-2}$ and at 60° C. according to teachings of the present disclosure.
Figure 16:
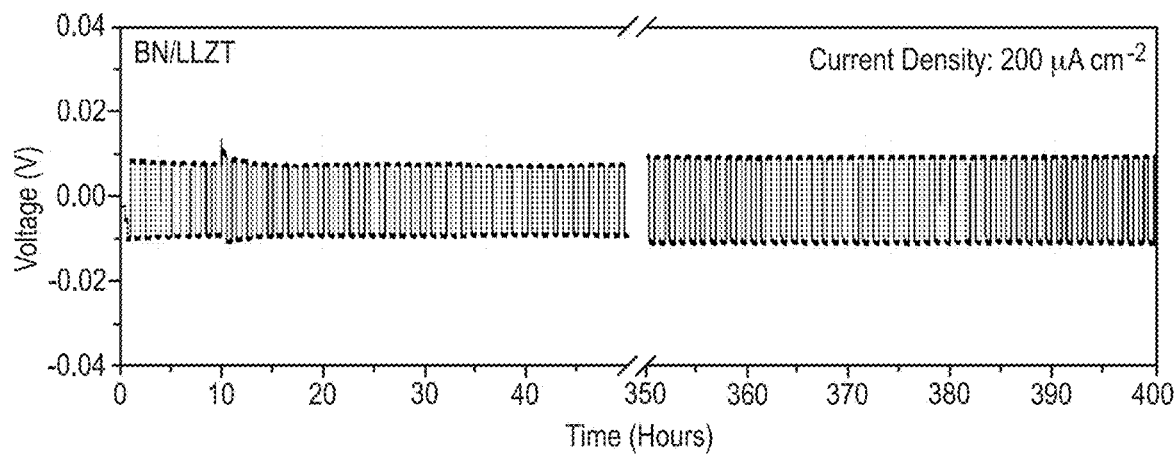
FIG. 16 is a graphic illustration of galvanostatic plating/stripping of symmetrical cell at 0.2 mA cm$^{-2}$ according to teachings of the present disclosure.
Figure 17:
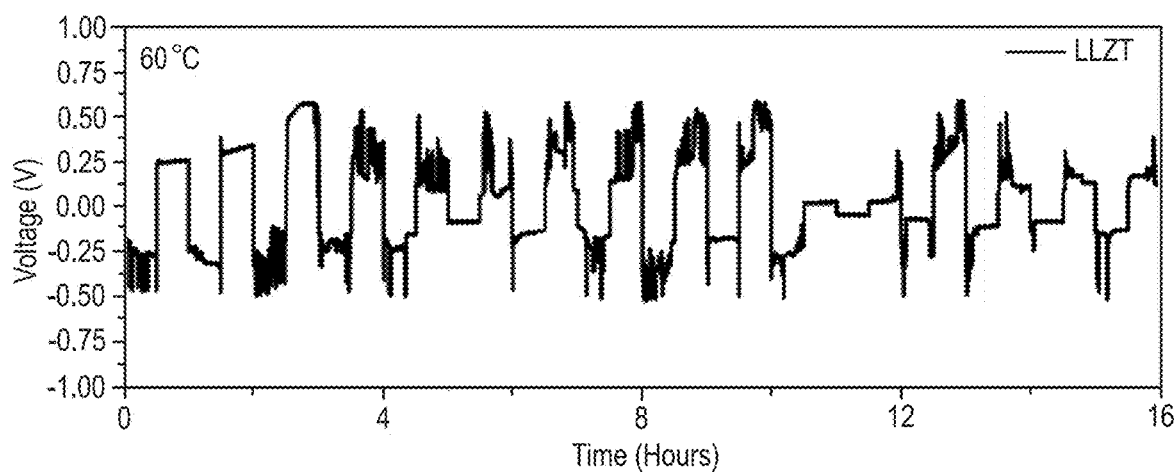
FIG. 17 is a graphic illustration of galvanostatic plating/stripping of symmetrical cell at 0.2 mA cm$^{-2}$ according to teachings of the present disclosure.

Direct current (d. c.) Li plating/stripping experiments (30 min plating/stripping) were carried out at different current densities at 60° C. to characterize Li-ion transport across the interface. At 0.2 mA cm-2 current density, BN/LLZT symmetrical cell initially exhibited very low over-potential of 10 mV, and 12 mV after 400 hours of operation (FIG. 16). At a higher current density of 0.5 mA cm-2 the symmetrical cell exhibited stable cycling for over 200 hours with a constant polarization of 27 mV, as seen in FIG. 4D. Such low polarization is only possible with well-adhered interfaces that offer negligible interfacial resistance. Further, the mechanism of Li-ion conduction is through the defects, such as dandling bonds of Boron and vacancy sites of Nitrogen present in the h-BN layer as characterized and discussed earlier. On the other hand, as-synthesized LLZT exhibited a noisy signal with large polarization at a lower current density of 0.2 mA $cm^{-2}$ (FIG. 17). This is due to non-uniform interfacial contact between LLZT and Li. Critical current density (CCD) for dendrite propagation through h-BN-coated surface cleaned LLZT was found to be 0.9 mA $cm^{-2}$ (FIG. 4B). In contrast, the CCD for as-synthesized LLZT is 0.25 mA $cm^{-2}$ at 60° C. Postmortem analysis after Li plating/stripping was carried out on both as-synthesized and h-BN coated surface cleaned LLZT pellets using optical microscopy and FE-SEM. As seen from FIG. 5A, the penetration of Li metal is evident through spots marked in the figure even at a lower current density of 0.2 mA $cm^{-2}$. Further, the propagation of Li metal induced cracks on the surface. Li metal was also observed to propagate through these cracks, as seen in the FE-SEM image FIG. 5B. The non-uniform contact between LLZT and Li that increases the Li-ion flux in the regions that is contact with the Li metal that further creates high stress resulting in the formation of cracks. In contrast, BN-coated LLZT did not show any such deposits of metallic Li or crack formation even after cycling for 200 hours at 0.5 mA $cm^{-2}$ FIGS. 5C and 5D, which also further proves the existence of a homogeneous Li-ion flux. The data from stable Li plating/stripping demonstrates the inhibition of Li dendrite propagation across the interface in h-BN coated LLZT pellets. These observations can be explained using multiple reasons, including: (i) good adherence at the interface, (ii) absence of surface impurities that induce Li dendrite propagation, (iii) ultra-thin h-BN coating that prevents electron tunneling across the interface, and (iv) excellent mechanical and chemical properties of h-BN.

Full Cell Performance:

All-solid-state batteries (ASSBs) were assembled using LFP, LLZT and Li as the cathode, electrolyte and anode, respectively. The cathode composite consists of 7:7:4:2 ratio of active material, LLZT powder, super-P carbon, and polyvinylidene difluoride (PVDF) binder. The ASSBs were cycled at C/5 rate at 60° C. with a cathode loading of 8-9 mg cm$^{-2}$, as shown in FIG. 6, to evaluate the electrochemical and mechanical stability of the interface with cycling. The ASSB prepared using as-synthesized LLZT showed drastic capacity loss right after a very few cycles which can be attributed to the loss in contact due to the volume expansion and contraction during charge/discharge process (FIG. 6A). The ASSB made using h-BN coated LLZT exhibited a stable capacity of 130 mAh g$^{-1}$ for over 100 cycles after a few initial cycles of activation. The ASSB delivered a capacity of 119 mAh g$^{-1}$ on the 100th cycle, i.e. a negligible capacity fade of 0.11 mAh g$^{-1}$ per cycle and the average coulombic efficiency was calculated to be 98.4%. The voltage profile was found to be long and flat, indicating the fast Li-ion across the solid-solid interface. Also, the BN/LLZT cell exhibited very small increase in polarization with cycling, 57 mV and 82 mV at 2nd and 50th cycles, respectively, even at a high charge/discharge rate of C/5. Small spikes observed in the first cycle are due to temperature fluctuations of the oven while opening and closing. On the other hand, the voltage profile of as-synthesized LLZT cell showed very large polarization of 310 mV in the first cycle due to the non-adherent interface formed and this further increased to 550 mV at the fifth cycle. The voltage plateau was also not flat indicating the increasing impedance to the flow of Li-ions across the interface during cycling. After cycling, Li metal anode was scrapped out of the ASSB inside a glovebox and LLZT pellet was analyzed using XPS. The B 1s spectrum in FIG. 6D indicates the presence of BN, BN$_x$O$_y$, and dangling B bonds, similar to the as-deposited BN XPS in FIG. 2D, with any significant peak shifts. This demonstrates that conformal h-BN coating is chemically stable and presence of the defect sites (dangling B bonds) after cycling proves the extent of chemical inertness of h-BN during battery cycling measurements. An increase in the BN$_x$O$_y$ peak is observed as the BN capping the BN$_x$O$_y$ layer might have been scrapped out along with the lithium metal anode. The well-resolved Zr 3d spectrum in FIG. 6B indicates the absence of surface contamination after cycling, which would not have been visible if surface impurities were present.

Conclusion

Herein, we report an effective strategy of combining surface chemistry and interlayer-based mechanisms to the tailor the interface between Li and garnet-type SSE. Pristine LLZT pellets with no Li$_2$CO$_3$ contamination were obtained by either argon-ion sputtering at 27-227° C., or UHV annealing at 777° C. Air exposures of pristine LLZT revealed spontaneous Li$_2$CO$_3$ formation in less than 10 minutes. 3 nm of h-BN deposited using ALD, immediately surface cleaning, passivated and protected LLZT pellets for over 2 months of air exposure. h-BN coated LLZT also demonstrated ultra-low interfacial resistance of 18 Ω cm2 at 60° C. and yielded a high critical current density of 0.9 mA cm$^{-2}$. Stable, dendrite-free, Li plating/stripping has also been recorded for Li|BN/LLZT|Li symmetrical cells for over 200 cycles at 0.5 mA cm$^{-2}$. Furthermore, stable, full cell capacity of 130 mAh g$^{-1}$ was observed for LiFePO$_4$/BN/LLZT|Li cell configuration for over 100 cycles with an average coulombic efficiency of 98.4%. This disclosure therefore clarifies that an interlayer-based approach is always required to prevent degradation of garnet-type SSEs in ambient storage and transfers, and the interlayer must be modified to prevent electron tunneling across the electrolyte that induces lithium dendrites.

All-solid-state batteries (ASSBs) are currently in the developmental stage, where few critical interfacial issues as described above presents the effective cycling of ASSBs. The invention described above solves most of the interfacial issues associated with the garnet-type solid-state electrolytes enabling the storage of garnet pellets in ambient atmosphere and further achieve better and longer battery performance. In the current technology conventional lithium-ion batteries are used with graphite anode, ~10 orders lower capacity (372 mAh g$^{-1}$) than metallic lithium, and it contains organic liquid electrolyte that has very low flash point that imposes fire and explosion hazard to their corresponding appliances that can result in catastrophic accidents. The invention above has the following advantages: storage of garnet-type solid-state electrolytes in open atmosphere, low interfacial resistance, inhibition of lithium dendrites propagation, better safety, use of lithium metal anode, and high critical current density.

A process for assembling an all-solid-state battery, comprises: synthesizing solid-state electrolytes (SSEs) to obtain pellets; introducing the pellets into a multichambered vacuum system; depositing h-BN on the pellets; placing Li foils on both sides of the h-BN deposited pellets; and coating a cathode composite material onto the h-BN deposited pellets.

The SSE includes Li$_{6.5}$La$_3$Zr$_{1.5}$Ta$_{0.5}$O$_{12}$ (LLZT).

Li$_2$CO$_3$, La$_2$O$_3$, ZrO$_2$ and Ta$_2$O$_5$, of the LLZT all have a purity of greater than 99%.

Synthesizing the SSEs includes: ball milling a mixture of the Li$_2$CO$_3$, La$_2$O$_3$, ZrO$_2$ and Ta$_2$O$_5$ and 2-propanol; vacuum drying the mixture to obtain a dry powder; calcining the dry powder; ball milling and drying the calcined powder to obtain LLZT powder; pressing the LLZT powder into pellets; covering the pellets with LLZT powder and sintering; and polishing to a set thickness.

The multichambered vacuum system includes an atomic layer deposition (ALD) chamber and an ultrahigh vacuum (UHV) chamber.

The process further comprises cleaning the LLZT pellet before depositing the h-BN.

Depositing the h-BN is performed via an atomic layer deposition (ALD) process.

The cathode composite material includes active material, LLZT powder, super-P carbon, and polyvinylidene difluoride (PVDF) binder.

The active material, LLZT powder, super-P carbon, and polyvinylidene difluoride (PVDF) binder are in a ratio of 7:7:4:2.

An all-solid-state battery is made from a process comprising: synthesizing solid-state electrolytes (SSEs) to obtain pellets; introducing the pellets into a multichambered vacuum system; depositing h-BN on the pellets; placing Li foils on both sides of the h-BN deposited pellets; and coating a cathode composite material onto the h-BN deposited pellets.

An all-solid-state battery comprises: a lithium metal anode; a solid-state electrolyte having a pellet coated with h-BN; and a cathode.

The pellet includes Li$_{6.5}$La$_3$Zr$_{1.5}$Ta$_{0.5}$O$_{12}$ (LLZT).

The cathode includes active material, LLZT powder, super-P carbon, and polyvinylidene difluoride (PVDF) binder.

The active material, LLZT powder, super-P carbon, and polyvinylidene difluoride (PVDF) binder are in a ratio of 7:7:4:2.

Thus, according to the disclosure a method of stabilizing a garnet-type solid-state electrolyte (SSE) includes obtaining pellets of SSE, removing surface impurities of the SSE, and depositing a passivation layer onto the SSE after the surface impurities are removed, the passivation layer including two of boron, carbon, and nitrogen. The method further includes positioning lithium on the passivation layer, and heating the lithium to at least 220° C. for at least one hour. The method further includes coating a cathode composite material onto the passivation layer. In one example, the passivation layer is hexagonal boron nitride (h-BN). Impurities are removed, in one example, by Argon ion sputtering a surface of the SSE at 227° C. In another example, removing the surface impurities includes annealing a surface of the SSE at 777° C. In one example, depositing the passivation layer includes depositing 3 nm of thickness of the passivation layer.

Also, according to the disclosure, a method for enabling an all-solid-state battery and inhibiting lithium dendrite propagation may include synthesizing solid-state electrolytes (SSEs) to obtain pellets, removing surface impurities from the SSE; depositing h-BN on the pellets through atomic layer deposition, placing Li foil on the h-BN deposited pellets, and coating a cathode composite material onto the h-BN deposited pellets.

Figure 18:
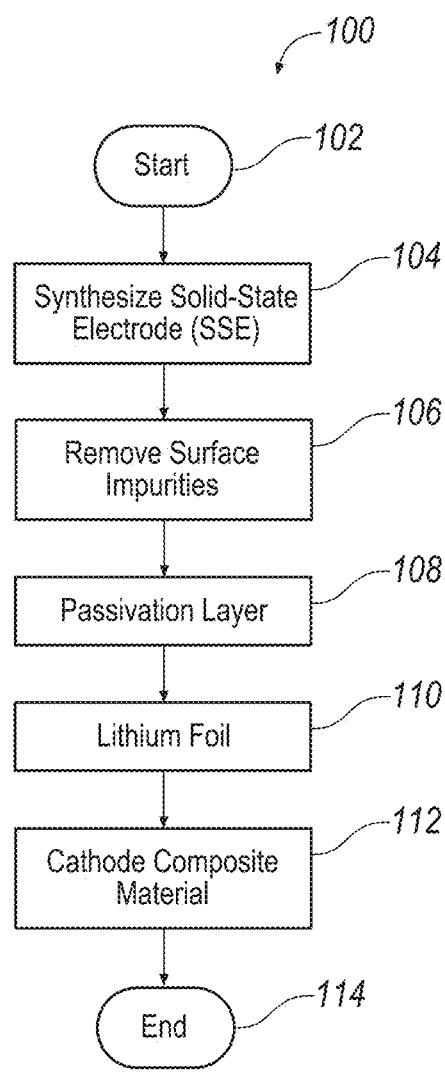
FIG. 18 illustrates steps for a method of stabilizing garnet-style garnet-type solid-state electronics according to one example of the disclosure.

FIG. 18 illustrates steps for a method of stabilizing garnet-style garnet-type solid-state electronics according to one example of the disclosure. Referring to FIG. 18, method 100 starts at step 100, and at step 104 a solid-stated electrode (SSE) is synthesized. Surface impurities are removed at step 106 and a passivation layer is applied at step 108. In one optional example, a lithium foil may be applied at step 110, and a cathode composite material is applied at step 112 and the process ends at step 114.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of medical imaging, it should be appreciated that the present techniques are not limited to such medical contexts. The provision of examples and explanations in such a medical context is to facilitate explanation by providing instances of implementations and applications. The disclosed approaches may also be utilized in other contexts, such as the non-destructive inspection of manufactured parts or goods (i.e., quality control or quality review applications), and/or the non-invasive inspection or imaging techniques.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description but is only limited by the scope of the appended claims.

What is claimed is:

1. A method of stabilizing a garnet-type solid-state electrolyte (SSE), comprising: obtaining pellets of SSE; removing surface impurities of the SSE; and depositing a passivation layer of boron nitride (BN) comprising dangling boron bonds onto the SSE, after the surface impurities are removed, using precursor materials including tris(dimethylamino)borane (TDMAB) and ammonia ($NH_3$) via alternating exposures of TDMAB and $NH_3$ for a predetermined number of cycles.

2. The method of claim 1, further comprising positioning lithium on the passivation layer.

3. The method of claim 2, further comprising at least one of:
heating the lithium to at least 220° C.; and
heating the lithium for at least one hour.

4. The method of claim 1, further comprising coating a cathode composite material onto the passivation layer.

5. The method of claim 1, wherein the passivation layer comprises hexagonal boron nitride (h-BN).

6. The method of claim 1, wherein removing the surface impurities further comprises Argon ion sputtering a surface of the SSE.

7. The method of claim 6, wherein the Argon ion sputtering is at 227° C.

8. The method of claim 1, wherein removing the surface impurities further comprises annealing a surface of the SSE.

9. The method of claim 1, further comprising forming a $BN_xO_y$ layer between the passivation layer of BN and the SSE.

10. The method of claim 1, wherein depositing the passivation layer comprises depositing 3 nm of thickness of the passivation layer.

11. The method of claim 1, wherein depositing the passivation layer further comprises depositing the passivation layer through atomic layer deposition (ALD).

12. The method of claim 1, wherein the predetermined number of cycles is between 3 and 20 cycles.

13. A lithium battery, comprising:
a garnet-type solid-state electrolyte (SSE);
a passivation layer on the SSE;
an interface layer of $BN_xO_y$ disposed between the passivation layer and the SSE;
a cathode composite positioned on the passivation layer; and
wherein the passivation layer comprises a boron nitride (BN) film with dangling boron bonds.

14. The lithium battery of claim 13, wherein the BN film comprises atomic layer deposited hexagonal boron nitride (h-BN).

15. The lithium battery of claim 13, wherein the passivation layer has a thickness of 3 nm.

16. The lithium battery of claim 13, wherein at least one of:
the SSE includes $Li_{6.5}La_3Zr_{1.5}Ta_{0.5}O_{12}$ (LLZT); and
the cathode composite comprises $LiFePO_4$ (LFP).

17. The lithium battery of claim 13, further comprising a lithium metal anode.

18. A method of stabilizing a garnet-type solid-state electrolyte (SSE), comprising:
providing pellets of SSE;
removing surface impurities of the SSE;

depositing a passivation layer onto the SSE after the surface impurities are removed, the passivation layer including a boron nitride (BN) film with dangling boron bonds; and forming a $BN_xO_y$ interface between the passivation layer and the SSE.

19. The method of claim 18, wherein the passivation layer is deposited using precursor materials including tris(dimethylamino)borane (TDMAB) and ammonia ($NH_3$) via alternating exposures of TDMAB and $NH_3$ for a predetermined number of cycles.

* * * * *